United States Patent
Kurokawa

(10) Patent No.: US 10,032,128 B2
(45) Date of Patent: Jul. 24, 2018

(54) YARD MANAGEMENT APPARATUS, YARD MANAGEMENT METHOD, AND COMPUTER PROGRAM

(71) Applicant: NIPPON STEEL & SUMITOMO METAL CORPORATION, Tokyo (JP)

(72) Inventor: Tetsuaki Kurokawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 846 days.

(21) Appl. No.: 14/382,862

(22) PCT Filed: Mar. 7, 2013

(86) PCT No.: PCT/JP2013/056265
§ 371 (c)(1),
(2) Date: Sep. 4, 2014

(87) PCT Pub. No.: WO2013/133366
PCT Pub. Date: Sep. 12, 2013

(65) Prior Publication Data
US 2015/0012395 A1    Jan. 8, 2015

(30) Foreign Application Priority Data
Mar. 9, 2012 (JP) ................................. 2012-053478

(51) Int. Cl.
*G06Q 10/08* (2012.01)
*G06Q 50/04* (2012.01)
*B65G 63/00* (2006.01)

(52) U.S. Cl.
CPC ......... *G06Q 10/087* (2013.01); *G06Q 10/083* (2013.01); *G06Q 50/04* (2013.01); *B65G 63/002* (2013.01); *Y02P 90/30* (2015.11)

(58) Field of Classification Search
CPC .... G06Q 10/087; G06Q 50/04; G06Q 10/083; Y02P 90/30; B65G 63/002
See application file for complete search history.

(56) References Cited

FOREIGN PATENT DOCUMENTS

| JP | 06-179512 | 6/1994 |
|----|-----------|--------|
| JP | 06-179525 | 6/1994 |

(Continued)

OTHER PUBLICATIONS

International Search Report dated Apr. 23, 2013 issued in corresponding PCT Application No. PCT/JP2013/056265 [with English Translation].

(Continued)

*Primary Examiner* — Hajime Rojas
(74) *Attorney, Agent, or Firm* — Birch, Stewart, Kolasch & Birch, LLP

(57) ABSTRACT

By using, as decision variables, an initial transfer time (k_it_[i]) • a final transfer time (k_ft[i]) of each of transfer target steel materials (lots) i including materials to arrive and already arriving materials, a transfer constraint expression regarding the transfer order of the transfer target steel materials (lots) i and a transfer objective function for minimizing the time during which the transfer target steel material (lot) i stays in a course of being transferred to a main pile are expressed, and optimum values (k_it$_{opt}$[i], k_ft$_{opt}$[i]) of the initial transfer time • the final transfer time of the transfer target steel material (lot) i are derived so that the transfer objective function $J_A$ is minimized within a range satisfying the transfer constraint expression.

14 Claims, 7 Drawing Sheets

(56) References Cited

FOREIGN PATENT DOCUMENTS

| | | | |
|---|---|---|---|
| JP | 09-34715 | 2/1997 | |
| JP | 11-255336 | 9/1999 | |
| JP | 2000-226123 | 8/2000 | |
| JP | 2002-274652 | 9/2002 | |
| JP | 2007-084201 | 4/2007 | |
| JP | 2007-137612 | 6/2007 | |
| JP | 2007-269447 | 10/2007 | |
| JP | 2007-269448 | 10/2007 | |
| JP | 2008-260630 | 10/2008 | |
| JP | 2010-269929 | 12/2010 | |
| JP | 2011-105483 | 6/2011 | |
| JP | 2011-105483 A * | 6/2011 | ............. B65G 1/137 |

OTHER PUBLICATIONS

International Preliminary Report on Patentability dated Sep. 18, 2014 issued in corresponding PCT Application No. PCT/JP2013/056265.

* cited by examiner

YARD MANAGEMENT APPARATUS, YARD MANAGEMENT METHOD, AND COMPUTER PROGRAM

CROSS-REFERENCE TO RELATED APPLICATIONS

The present application is a National Stage of Int. Pat. App. No. PCT/JP2013/056265, filed Mar. 7, 2013, which claims priority to Japanese Pat. App. No. 2012-053478, filed Mar. 9, 2012.

FIELD OF THE INVENTION

The present invention relates to a yard management apparatus, a yard management method, and a computer program, and more particularly, to those suitably used for pile-sorting of metal materials in yards, to smoothly supply the metal materials such as slabs and coils for use in a subsequent step in metal manufacturing processes, and for pile-sorting of containers in physical distribution fields and the like.

BACKGROUND

When metal materials, e.g., steel materials, are transferred from, for example, a steel-making step to a subsequent metal manufacturing process, such as a rolling step, which is a subsequent step in an iron-making process, the steel materials are first kept in temporary storage sites called yards and thereafter are carried out from the yards according to the processing time of the subsequent step, for example, according to the processing time of the rolling step where that is the subsequent step. An example of layout of the yards is shown in FIG. 5. As shown in FIG. 5, the yards are storage spaces 501 to 504 demarcated vertically and laterally as buffer areas for supplying the steel materials such as slabs delivered from an upstream step to a downstream step. Vertical segments and lateral segments are often called "columns" and "rows" respectively. Specifically, cranes (1A, 1B, 2A, 2B) are movable in the rows to transfer the steel materials between different columns in the same row. Further, the steel materials are transferred between the rows by transfer tables. When a transfer command is created, "row" and "column" are designated to indicate where to transfer the steel materials (refer to the parenthetical numbers (11), (12), (21), and (22) appended to the storage spaces 501 to 504 in FIG. 5).

Next, a basic work flow in the yards is shown, taking FIG. 5 as an example. First, the steel materials carried out from a continuous casting machine 510 in a steel-making step being a pre-step are carried to the yard by a reception table X via a piler 511, are transferred to any one of the demarcated storage spaces 501 to 504 by the crane 1A, 1B, 2A, 2B to be stacked there. Then, according to a manufacturing schedule of the rolling step being a post-step, they are placed again on a delivery table Z by the crane 1A, 1B, 2A, 2B to be transferred to the rolling step. Generally, the steel materials are placed in the stacked state in the yard as described above. This is intended to make an effective use of a limited yard area. On the other hand, when the steel materials are stacked, in order to facilitate their supply to the subsequent step, it is naturally necessary that their stacking order from the top needs to be the order in which they are processed in the subsequent step. Here, dividing the steel materials into a plurality of piles is called pile sorting.

In the present application, the term "main pile" means final pile where they are stacked for delivery to the subsequent step (also called a delivery pile). In the present application, the term "original pile" means pile that has already been formed in the yard at a present moment. Therefore, the original piles include a main storage part and a temporary storage part. In the present application, the term "temporary pile" means pile for forcible temporary storage at the time of the transfer from the original pile or the reception table to the main pile at and after the present moment.

In the pile sorting process performed in the yard in order to smoothly deliver the required steel materials to a post-step, it can often happen that the originally scheduled steel materials do not arrive because the steel materials scheduled to arrive are downgraded (because of a quality trouble or the like occurring when the steel materials are manufactured, they are downgraded and the originally planned use is changed to another use), the steel materials scheduled to arrive require a precise adjustment process that is not scheduled, and a size change occurs. Further, it cannot be expected almost at all that the state of the storage spaces of the yard changes without any trouble as originally scheduled, and it is an everyday event that unexpected steel materials are forced to be placed on unscheduled storage spaces.

Therefore, as a method to cope with such a situation, frequent re-scheduling (at intervals of several minutes) is performed to readjust a delivery pile appearance (main pile appearance) and a transfer procedure for creating it.

In particular, in order to reschedule the procedure of transfer processes for realizing the delivery pile appearance (main pile appearance), it is necessary to assume many transfer processes required to realize the delivery pile appearance from various states in the yard and to efficiently decide their execution order.

Such rescheduling of the procedure of the transfer processes is a problem difficult to solve in no small way for the following reasons, and a wrong solution could cause congestion of the reception tables, congestion of the transfer works due to the occurrence of a transfer load exceeding the capacity of the cranes, and a failure in the yard management because no storage space is found in the yard.

Reasons why this rescheduling problem is difficult to solve are that, firstly, in the yard, some steel materials are placed in a temporary storage state (a pile state in which they are temporarily stacked until an appropriate timing comes though they are finally separated to be transferred to respective delivery piles), and some others are placed as the main storage (part of the delivery piles), and it is necessary to find to which (temporary storage or main storage) each of the steel materials belongs and decide the transfer order of the steel materials so that the steel materials for the temporary storage come to have a delivery pile appearance most efficiently (with the minimum number of transfer times). Further, since the delivery pile is sometimes formed by the mixture of steel materials already present in the yard and steel materials which are to arrive in the yard later, the aforesaid rescheduling cannot be decided only based on the steel materials which have already arrived at the yard, and has to be decided in consideration of the steel materials which are scheduled to arrive later. That is, the rescheduling has to be performed in consideration of the mixture of both the transfer of the steel materials which have already arrived (relocation process) being a static factor and the transfer of the steel materials which are scheduled to arrive (reception process) being a dynamic factor. Therefore, only with the relocation process (static factor), the re-stacking is done by performing the transfer in a physically handleable order in consideration of the stacked state, but when the steel materials which have not yet arrived and the steel materials which have already arrived are mixed, the arrival timing of the steel materials which have not yet arrived has to be found and the relocation process (decomposition process of the original pile) has to be performed in consideration of the arrival timing, and accordingly the timing of the relocation process cannot be easily decided either.

Variations of the transfer process of the materials to arrive include a case where they can be transferred directly to the main pile (delivery pile) from the reception table and a case where they have to be once transferred to and temporarily stored at a place (temporary pile) different from the main pile at the time of the reception and have to be transferred to the main pile when an appropriate condition is ready. Further, variations of the transfer process of the already arriving materials also include a case where they need not be moved from the original pile, a case where they can be transferred directly to the main pile from the original pile, and a case where they need to be once transferred to and temporarily stored at a place (temporary pile) different from the main pile before transferred to the main pile.

As described above, when the temporary storage is required, the transfer needs to be performed twice, that is, the transfer from the reception table or the original storage place (original pile) to the temporary storage place (temporary pile) and the transfer from the temporary storage place (temporary pile) to the main pile, and in order to reduce the total number of transfer times, it is important to reduce such a case.

Serious situations when a transfer plan of the steel materials in the yard is not appropriate includes a case where it is not possible to reserve the storage space in the yard because the number of steel materials to be temporarily stored is too large or the temporary storage time becomes too long, resulting in a failure in the yard management. Further, there may be a case where the reception tables are congested because the relocation process in the yard takes too long a time and the reception process cannot be handled, causing a situation where a pre-step is forced to be stopped. Giving a great adverse effect to the production, all of these cases are situations that have to be prevented by all means. Therefore, it is important to appropriately make a transfer plan of the steel materials in the yard.

In a conventional practice, a person in charge of planning makes a steel material transfer plan for the pile-sorting of steel materials by trial and error, based on information on steel materials which are to be received in a yard, information on steel materials already placed in the yard, and information on a delivery pile appearance (main pile appearance). However, in such manual planning, it has not been often possible to prepare an "efficient" transfer plan when the number of the steel materials that are targets of the planning is large and the number of transfer times is large. Further, since the preparation of the plan requires skill, an individual difference occurs in the prepared plans, and depending on a preparer of the plan, there occurs a problem that the yard cannot be effectively used and no storage place is reserved. There is another problem that it takes a long period to cultivate a skilled person in charge. Incidentally, the "appropriate" transfer plan here means that the number of transfer times, the temporary storage space, and the temporary storage time are reduced as much as possible without causing the reception congestion, in realizing the delivery pile appearance from the current state of the yard piles.

As a storage space management method requiring these, several methods have been developed. An art described in Japanese Laid-Open Patent Publication No. 06-179525 ("JP 06-179525") is a basic one in which products are stacked in order so that no stack shifting occurs at the time of the delivery, by using an information file regarding stacking. Japanese Laid-Open Patent Publication No. 2000-226123 ("JP 2000-226123") also proposes a very basic storage space management method to form articles in a large lot into a single pile to prevent the articles in the large lot from being stacked on an upper side of articles in a small lot, thereby reducing a relocation work at the time of shipping.

Further, Japanese Laid-Open Patent Publication No. 11-255336 ("JP 11-255336") proposes a steel sheet stacking planning method whose object is to prepare an optimum stacking order plan satisfying conditions at the time of the stacking in a yard, automatically and in a relatively short time even when the number of steel sheets that are targets of the plan becomes enormous. This art adopts a procedure in which the steel sheets are grouped based on conditions such as sizes and the rolling order of the steel sheets, a plurality of arrangement patterns different in the arrangement order of the groups are prepared, simulations in which the stacking is started from the top group of each arrangement pattern are conducted based on stacking determination conditions, and based on the result thereof, the number of piles is found for each of the arrangement patterns, the arrangement pattern with the minimum number of piles is selected, further a predetermined number of the arrangement patterns are selected in ascending order of the number of piles from the prepared arrangement patterns, the group arrangement orders are changed among the selected arrangement patterns to prepare a plurality of new arrangement patterns, and the arrangement pattern with the minimum number of piles is similarly selected from these prepared arrangement patterns and the arrangement pattern with the minimum number of piles.

Further, Japanese Laid-Open Patent Publication No. 2007-84201 ("JP 2007-84201") proposes a storage space management method including: a pile sorting step of deciding how slabs should be allocated to piles; a lot dividing step of deciding how the slabs should be divided into transfer lots; a lot generation order deciding step of deciding in what order the transfer lots decided by the lot dividing step should be generated; a work instruction generating step of generating a work instruction of a handling apparatus for executing the lot generation order decided in the lot generation order deciding step; and a vacant address deciding step of deciding to which place obstructive slabs should be evacuated while target slabs are taken out.

Further, Japanese Laid-open Patent Publication No. 2008-260630 ("JP 2008-260630") discloses a method to realize pile sorting in which steel materials that are targets of the pile sorting are regarded as a set, steel material subsets being subsets of this set are first generated, and after feasible piles being subsets satisfying a stacking constraint are subsequently extracted out of the steel material subsets, an optimum solution as the optimum subset of the feasible piles in view of storage space management is calculated.

Finally, Japanese Laid-Open Patent Publication No. 2010-269929 ("JP 2010-269929") discloses an art in which, in a pile sorting plan, an objective function having both an index for maximizing a pile height and an index for minimizing the number of transfer times realizing this is set, it is made to result in a mathematical programming problem satisfying a constraint condition regarding stacking and transfer, thereby optimizing the pile sorting and the transfer order simultaneously.

SUMMARY

Technical Problem

The inventions described in JP 06-179525, JP 2000-226123, JP 11-255336, and JP 2008-260630 are inventions for a case where the pile sorting is planned for, what is called, materials to arrive which are scheduled to arrive at the yard later, and they study the delivery pile appearance (main pile appearance), that is, how appropriately the pile sorting of the target steel materials is to be performed. However, no study is made on a problem to optimize the transfer order of the steel materials in order to make such a delivery pile.

Further, JP 2007-84201 and JP 2010-269929 study the problems of both the delivery pile appearance (main pile appearance) and the transfer order for realizing this. JP 2007-84201 adopts the two-stage optimizing method of first optimizing the delivery pile appearance (main pile appearance) and thereafter optimizing the transfer order of the steel materials for making this. On the other hand, JP 2010-269929 proposes the method of simultaneously optimizing both of the pile sorting and the transfer order for realizing this.

Therefore, both of JP 2007-84201 and JP 2010-269929, though making the plan for the transfer order, assume only a case where the delivery pile appearance (main pile appearance) is to be realized only based on the steel materials already placed in the yard. A reason for such assumption is that it is premised that the delivery order to the subsequent step has not been decided at an instant when the steel materials arrive from the pre-step and the delivery order to the subsequent step is decided while they stay in the yard, and therefore, it is not until this instant that an appropriate delivery pile appearance can be found. Incidentally, such a state is called "received material stacking case" in JP 2010-269929.

However, in actual cases, besides the "received material stacking case," there are more cases where at the instant when the steel materials arrive from the pre-step, the delivery order to the subsequent step has been decided, that is, the delivery pile appearance (main pile appearance) can be decided.

When the delivery pile appearance (main pile appearance) has been decided at the instant of the reception, it can be thought to decide the transfer order of all the steel materials in advance based on the information on the materials scheduled to arrive and handle them according to this, but as previously described, the case where the originally scheduled steel materials do not arrive can frequently occur because the steel materials scheduled to arrive are downgraded, the unexpected precise adjustment of the steel materials scheduled to arrive becomes necessary, or the size is changed. However, re-stacking the steel materials after the reception of the steel materials is finished results in an increase in re-working, and therefore, it is naturally more efficient that the delivery pile is gradually formed while the steel materials are received.

Therefore, as described above, the transfer order of the steel materials in the yard cannot be decided only based on the steel materials which have already arrived at the yard or only on the steel materials scheduled to arrive there, and is forced to be decided in consideration of both the steel materials which have already arrived at the yard and the steel materials which are scheduled to arrive there later. That is, as described above, the transfer order in the yard has to be found in consideration of the mixture of both the transfer of the steel materials which have already arrived (relocation process) being the static factor and the transfer of the steel materials which are scheduled to arrive (reception process) being the dynamic factor. Therefore, only with the relocation process (static factor), the steel materials are transferred in the physically handleable order in consideration of the stacked state of the steel materials, and the steel materials are re-stacked, but when the relocation process (static factor) and the reception process (dynamic factor) are mixed, it is necessary to find the arrival timing of the steel materials to arrive, and perform the relocation process in consideration of the arrival timing, and accordingly the timing of the relocation process cannot be easily decided either.

In view of the above-described problems of the conventional arts, it is an important problem to make a transfer plan in which, considering the mixture of both the transfer of the steel materials which have already arrived (relocation process) being the static factor and the transfer of the steel materials which are scheduled to arrive (reception process) being the dynamic factor, the arrival timing of the steel materials to arrive is found and the timing of the relocation process is appropriately decided in consideration of the arrival timing.

Here, a difficulty in deciding the transfer order when the delivery pile is formed by mixing the steel materials to arrive and the already arriving steel materials will be described based on examples.

FIG. 6 is a view conceptually showing a first example of creating delivery piles by mixing steel materials to arrive and already arriving steel materials.

For example, let us consider a case where a steel material A which is an already arriving material needs to be transferred from an original pile Z to a main pile (delivery pile) at an appropriate timing as shown in FIG. 6. Specifically, when a steel material B (lower side: arrival time $T_B$) and a steel material C (upper side: arrival time Tc ($>T_B$)) which, in a main pile X, are disposed on upper and lower sides of the steel material A being the already arriving material are materials to arrive, the transfer without any temporary storage is possible if the steel material A is transferred to the main pile X between these arrival times. In order to make this possible, if, on the upper side of the steel material A in the original pile Z having the steel material A, there is a steel material D being its upper stacked material, the steel material D needs to be removed before the arrival time $T_C$ of the steel material C at the latest. Here, if the steel material D is also a steel material which needs to be temporarily stored (material for temporary storage), it is desirable that the steel material D, similarly to the steel material A, is also transferred between the arrival times of a steel material E (lower side: arrival time $T_E$) and a steel material F (upper side: arrival time $T_F$ ($>T_E$)) which are disposed on upper and lower sides of the steel material D in a main pile Y, but here (if the required transfer time and so on are disregarded), when $T_E<T_C$, both the materials A, D for temporary storage appearing here can be directly transferred to the main pile Y (delivery pile) without being further temporarily stored. However, when $T_E>T_C$, the steel material D which exists on the upper side of the steel material A in the original pile Z even at the time $T_C$ cannot be directly transferred to the main pile Y and has to be temporarily stored because the steel material E has not arrived when the steel material C arrives.

Incidentally, in this case, the steel material D is temporarily stored, the steel material A is transferred to the main pile X, and thereafter, the steel material C is directly transferred to the main pile X after arriving, or the steel material C arriving first is temporarily stored and after the steel material E arrives, the steel material D is directly transferred to the main pile Y. A state where the transfer does not continue unless any of the steel materials is temporarily stored in transfer chains mutually related to one another as in this example will be called "conflict." The above example (when $T_E > T_C$) can be said to be a state where the conflict necessitating the temporary storage of either the steel material D or the steel material C is occurring. As can be inferred from this example, this conflict can occur in multiple chains. This will be described with reference to FIG. 7.

FIG. 7 is a view conceptually showing a second example of creating delivery piles by mixing steel materials to arrive and already arriving steel materials.

As shown in FIG. 7, in order to directly transfer a steel material A to a main pile $X_1$, it is necessary that a steel material B being a lower stacked material in an original pile $Y_1$ has been prepared (the steel material B has been transferred to the main pile $X_1$) at an instant when the steel material A arrives. However, since a steel material C is on an upper side of the steel material B in the original pile $Y_1$, it is necessary to prepare a steel material D in order to transfer the steel material C to a main pile $X_2$. However, since a steel material E is on an upper side of the steel material D in an original pile $Y_2$, it is necessary to prepare a steel material F in order to transfer the steel material E to a main pile $X_3$. However, since the steel material F has not arrived yet, its advance preparation is not possible. That is, in this chain, the main pile has to be created by using the last steel material F first, but since the steel material F has not arrived yet, the creation of the main pile cannot be started, and thus there is no choice but to cut one of the chains (that is, to perform the temporary storage) to perform the transfer work.

Since the following methods are possible in this case, this case can be said to be conflict in the following three patterns.

The steel material E is temporarily stored→ the steel material D is prepared→ the steel material C is directly transferred (the main pile $X_2$ of the steel materials D, C is completed, the steel material B is prepared)→ the steel material A is directly transferred (the main pile $X_1$ of the steel materials B, A is completed)→ the steel material E is secondarily transferred after the steel material F arrives (the main pile $X_3$ of the steel materials E, F is completed)

The steel material C is temporarily stored→ the steel material B is prepared→ the steel material A is directly transferred (the main pile $X_1$ of the steel materials B, A is completed)→ the steel material E is secondarily transferred after the steel material F arrives (the main pile $X_3$ of the steel materials E, F is completed, the steel material D is prepared)→ the steel material C is secondarily transferred (the main pile $X_2$ of the steel materials D, C is completed)

the steel material A is temporarily stored→ the steel material E is secondarily transferred after the steel material F arrives (the main pile $X_3$ of the steel materials E, F is completed, the steel material D is prepared)→ the steel material C is directly transferred (the main pile $X_2$ of the steel materials D, C is completed, the steel material B is prepared)→ the steel material A is secondarily transferred (the main pile $X_1$ of the steel materials B, A is completed)

As is also understood from this example, such conflict can continue over and over again as follows.

At the instant when the steel material A arrives, in order to directly transfer the steel material A to the main pile $X_1$, the preparation of the steel material B being the lower stacked material of the original pile $Y_1$ is necessary. This is because, in the main pile $X_1$, the steel material B is the lower stacked material and the steel material A is the upper stacked material.

However, since the steel material C is on the upper side of the steel material B, the preparation of the steel material D is necessary in order to transfer the steel material C to the main pile $X_2$. However, since the steel material E is on the upper side of the steel material D, the preparation of the steel material F is necessary in order to transfer the steel material E to the main pile $X_3$. However, the steel material F has not arrived yet.

As described above, since the detection itself of how the conflict is occurring is not easy, it is an extremely troublesome problem to determine which of the steel materials (transfer lots) should be used for solving the conflict chain state that could occur over and over again (for performing the temporary storage). Here, the transfer lot refers to a set of steel materials that can be transferred by one carrier.

JP 2010-269929 introduces a concept called a temporary storage determining variable ($y[p][s_1][s_2]$) to formulate the occurrence of temporary storage, thereby taking a measure to minimize the occurrence. However, JP 2010-269929 sets the problem on the premise that the pile already existing in the yard is decomposed to create the delivery pile (main pile) as described above, and does not take into consideration the transfer order and the conflict among the transfer lots in the state where the materials to arrive and the already arriving materials are mixed as in the previous examples. Therefore, it is not possible at all to cope with the conflict occurring between the materials to arrive and the already arriving materials.

Further, when the temporary storage occurs, in order to reduce the temporary storage space, it is required to place them as compactly as possible, but any of the aforesaid documents teaches a clear measure for this.

In addition, as a matter of course, the delivery pile appearance as well as the transfer order is simultaneously optimized in JP 2010-269929, resulting in a mathematical programming problem on a very large scale even when the number of targets is small.

In view of the above-described problems of the conventional arts, in deciding the transfer order plan of the steel materials in the yard in the state where the materials to arrive and the already arriving materials are mixed, it is necessary to reduce the number of times the steel materials are transferred (that is, reduce the number of temporary storage times) and to decide the transfer order plan in which the temporary storage time and the waiting time on the reception table are short, in a short time for the problem on an actual scale, by considering the occurrence of the chain state of the conflicts that could occur over and over again as described above and by determining which transfer lot should be used for solving this (for performing the temporary storage).

The above problems occur not only in the steel materials but also in other metal materials which are transferred in a yard in forms of slabs, coils, and the like.

The present invention was made in consideration of the above-described problems, and its first object is to make it possible to decide which metal material is to be temporarily stored even under a situation where already arriving materials which have already arrived at a yard and materials to arrive which are scheduled to arrive at the yard later are mixed.

Further, a second object of the present invention is to reduce the temporary storage of metal materials as much as possible.

Solution to the Problem

The yard management apparatus of the present invention is a yard management apparatus for causing a carrier to transfer metal materials which have already arrived at a yard and metal materials which have not yet arrived at the yard, in a unit of a transfer unit composed of one metal material or more, the yard being an inter-step storage space where the metal materials including at least one of semi-finished products, final products, and containers are disposed, and for creating a main pile composed of the metal materials stacked in stacking order according to delivery order to a post-step of the yard, the apparatus including: an information obtaining arrangement which externally obtains information which includes: pieces of metal material identification information corresponding respectively to the metal materials which have already arrived and the metal materials which have not arrived yet, for identifying the relevant metal material; pieces of main pile information corresponding respectively to the metal materials which have already arrived and the metal materials which have not arrived yet, including information for specifying the main pile being a transfer destination and information on a stacking position of the relevant metal material in the main pile; pieces of original pile information respectively corresponding to the metal materials which have already arrived, including information for specifying to which original pile composed of metal materials stacked in the yard at a present moment the relevant metal material belongs and information on a stacking position, in the relevant original pile, of the relevant metal material which has already arrived; and pieces of scheduled arrival time information respectively corresponding to the metal materials which have not arrived yet, indicating a scheduled arrival time at a reception entrance of the yard; a transfer time constraint expression setting arrangement which sets transfer time constraint expressions for respective transfer target metal materials each composed of the metal materials in the number in the transfer unit, based on the information obtained by the information obtaining arrangement, the transfer time constraint expressions each being a constraint expression which includes, as a variable, at least one of an initial transfer time being a first transfer start time and a final transfer time being a transfer start time when the main pile is the transfer destination, with respect to the present moment and which expresses a constraint relating to a transfer time of the transfer target metal material by the carrier; a transfer time objective function setting arrangement which sets transfer time objective functions for the respective transfer target metal materials, based on the information obtained by the information obtaining arrangement, the transfer time objective functions each being an objective function which includes, as a variable, at least one of the initial transfer time and the final transfer time and which expresses a time during which the transfer target metal material stays in a course of being transferred to the main pile; a transfer time optimum solution calculating arrangement which calculates, for each of the transfer target metal materials, an optimum value of the initial transfer time and an optimum value of the final transfer time so as to satisfy the transfer time constraint expression and minimize a value of the transfer time objective function; and a temporary pile deciding arrangement which determines, for each of the transfer target metal materials, whether or not the relevant transfer target metal material needs to be temporarily stored at the yard to form a temporary pile before being disposed in the main pile, based on the optimum value of the initial transfer time and the optimum value of the final transfer time, and decides the transfer target metal material that is to be a target of the temporary storage.

The yard management method of the present invention is a yard management method for causing a carrier to transfer metal materials which have already arrived at a yard and metal materials which have not yet arrived at the yard, in a unit of a transfer unit composed of one metal material or more, the yard being an inter-step storage space where the metal materials including at least one of semi-finished products, final products, and containers are disposed, and for creating a main pile composed of the metal materials stacked in stacking order according to delivery order to a post-step of the yard, the method including: an information obtaining step of externally obtaining information which includes: pieces of metal material identification information corresponding respectively to the metal materials which have already arrived and the metal materials which have not arrived yet, for identifying the relevant metal material; pieces of main pile information corresponding respectively to the metal materials which have already arrived and the metal materials which have not arrived yet, including information for specifying the main pile being a transfer destination and information on a stacking position of the relevant metal material in the main pile; pieces of original pile information respectively corresponding to the metal materials which have already arrived, including information for specifying to which original pile composed of metal materials stacked in the yard at a present moment the relevant metal material belongs and information on a stacking position, in the relevant original pile, of the relevant metal material which has already arrived; and pieces of scheduled arrival time information respectively corresponding to the metal materials which have not arrived yet, indicating a scheduled arrival time at a reception entrance of the yard; a transfer time constraint expression setting step of setting transfer time constraint expressions for respective transfer target metal materials each composed of the metal materials in the number in the transfer unit, based on the information obtained in the information obtaining step, the transfer time constraint expressions each being a constraint expression which includes, as a variable, at least one of an initial transfer time being a first transfer start time and a final transfer time being a transfer start time when the main pile is the transfer destination, with respect to the present moment and which expresses a constraint relating to a transfer time of the transfer target metal material by the carrier; a transfer time objective function setting step of setting transfer time objective functions for the respective transfer target metal materials, based on the information obtained in the information obtaining step, the transfer time objective functions each being an objective function which includes, as a variable, at least one of the initial transfer time and the final transfer time and which expresses a time during which the transfer target metal material stays in a course of being transferred to the main pile; a transfer time optimum solution calculating arrangement which calculates, for each of the transfer target metal materials, an optimum value of the initial transfer time and an optimum value of the final transfer time so as to satisfy the transfer time constraint expression and minimize a value of the transfer time objective function; and a temporary pile deciding step of determining, for each of the transfer target metal materials, whether or not the relevant transfer target metal material needs to be temporarily stored at the yard to form a temporary pile before being disposed in the main pile, based on the optimum value of the initial transfer time and the optimum value of the final transfer time, and decides the transfer target metal material that is to be a target of the temporary storage.

The computer program of the present invention is a computer program which causes a computer to execute yard management processes for causing a carrier to transfer metal materials which have already arrived at a yard and metal materials which have not yet arrived at the yard, in a unit of a transfer unit composed of one metal material or more, the yard being an inter-step storage space where the metal materials including at least one of semi-finished products, final products, and containers are disposed, and for creating a main pile composed of the metal materials stacked in stacking order according to delivery order to a post-step of the yard, the computer program causing the computer to execute: an information obtaining step of externally obtaining information which includes: pieces of metal material identification information corresponding respectively to the metal materials which have already arrived and the metal materials which have not arrived yet, for identifying the relevant metal material; pieces of main pile information corresponding respectively to the metal materials which have already arrived and the metal materials which have not arrived yet, including information for specifying the main pile being a transfer destination and information on a stacking position of the relevant metal material in the main pile; pieces of original pile information respectively corresponding to the metal materials which have already arrived, including information for specifying to which original pile composed of metal materials stacked in the yard at a present moment the relevant metal material belongs and information on a stacking position, in the relevant original pile, of the relevant metal material which has already arrived; and pieces of scheduled arrival time information respectively corresponding to the metal materials which have not arrived yet, indicating a scheduled arrival time at a reception entrance of the yard; a transfer time constraint expression setting step of setting transfer time constraint expressions for respective transfer target metal materials each composed of the metal materials in the number in the transfer unit, based on the information obtained in the information obtaining step, the transfer time constraint expressions each being a constraint expression which includes, as a variable, at least one of an initial transfer time being a first transfer start time and a final transfer time being a transfer start time when the main pile is the transfer destination, with respect to the present moment and which expresses a constraint relating to a transfer time of the transfer target metal material by the carrier; a transfer time objective function setting step of setting transfer time objective functions for the respective transfer target metal materials, based on the information obtained in the information obtaining step, the transfer time objective functions each being an objective function which includes, as a variable, at least one of the initial transfer time and the final transfer time and which expresses a time during which the transfer target metal material stays in a course of being transferred to the main pile; a transfer time optimum solution calculating step of calculating, for each of the transfer target metal materials, an optimum value of the initial transfer time and an optimum value of the final transfer time so as to satisfy the transfer time constraint expression and minimize a value of the transfer time objective function; and a temporary pile deciding step of determining, for each of the transfer target metal materials, whether or not the relevant transfer target metal material needs to be temporarily stored at the yard to form a temporary pile before being disposed in the main pile, based on the optimum value of the initial transfer time and the optimum value of the final transfer time, and decides the transfer target metal material that is to be a target of the temporary storage.

The present invention is applicable for use where metal materials that have already arrived at a yard and metal materials that have not yet arrived there are transferred and are discharged to a subsequent step by a carrier.

Advantageous Effects of Invention

According to the present invention, the optimum values of the initial transfer time and the final transfer time of each of the transfer target metal materials are found. Therefore, even when metal materials which have already arrived at the yard and metal materials which have not arrived yet at the yard both exist, it is possible to determine which of the transfer target metal materials is to be used for temporary storage (for breaking the conflict chain state).

Further, according to the other features of the present invention, the transfer target metal material that is to be the target of the temporary storage is specified from the optimum values of the initial transfer time and the final transfer time, and the disposition of the transfer target metal material in the temporary pile is decided so that the number of the temporary piles is reduced. Therefore, it is possible to reduce the temporary storage of the transfer target metal materials as much as possible.

DETAILED DESCRIPTION

Figure 1:
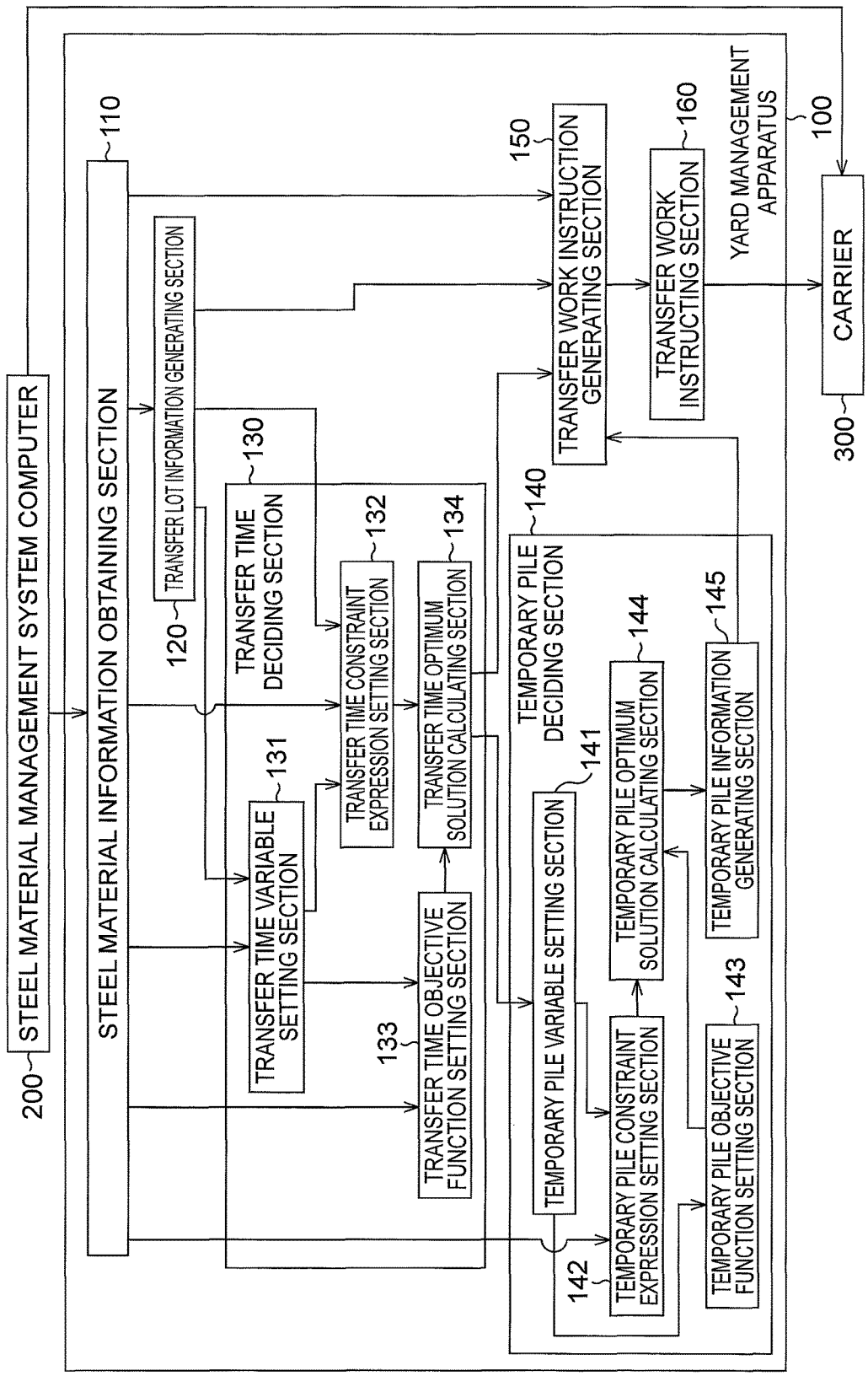
FIG. 1 is a diagram showing an example of a functional structure of a yard management apparatus.

As described above, regarding the chain state of the conflict (conflict state meaning which transfer lot is to be temporarily stored in a case where the transfer chains do not continue unless some of the transfer lots is temporarily stored, in the transfer chains related to one another) that can occur over and over again, it is a very difficult problem to determine which transfer lot is to be used for solving this (for performing the temporary storage) because the detection itself of how the conflict is occurring is not easy.

This embodiment proposes a method to very rationally solve this problem in a form of a solution of a mathematical programming problem by formulating the chain state of the conflict by a later-described ingenious method.

In this embodiment, in order to formulate the chain state of the conflict, two variables, that is, an initial (primary) transfer time and a final (secondary) transfer time, are defined for each transfer lot. The use of these variables enables a simpler expression of a complicated chain phenomenon of the conflict by a numerical expression. The conflict occurs when the following physical principles cannot be satisfied in a course of creating a main pile from a state of an original pile at the present moment.

Specifically, the temporary storage of transfer lots present in an original pile does not occur if an existing transfer lot can be directly transferred from the original pile to the main pile according to the order that (1): transfer lots present in the original pile are (decomposed) transferred in order from an upper side and (2): transfer lots transferred to the same main pile are (created) transferred in order from one located on a lower side of the main pile, and a transfer lot to arrive can be transferred directly to the main pile from a transfer table according to the aforesaid order. However, since it is not necessarily possible to transfer the transfer lots in the orders (1), (2), the temporary storage or the chain state of the conflict occurs.

Further another key to the formulation is that any transfer lot can be transferred to a main pile by only two transfer operations at the maximum. That is, any transfer lot can be transferred from a temporary storage space (original pile) or the transfer table to the main pile directly or after being temporarily stored once. This is because, if it is temporarily stored once, it only has to wait there until preparation for its transfer to the main pile is completed, and therefore, it need not be temporarily stored twice or more. However, consideration to prevent the occurrence of the temporary storage during the transfer from the temporary pile to the main pile is necessary (refer to stacking order (appearance) constraints (an expression (13-1) to an expression (13-3)).

In the following description, the first transfer will be called primary transfer, and the final transfer will be called secondary transfer. It is a matter of course that the primary transfer and the secondary transfer are the same when the direct transfer to the main pile is possible without any temporary storage.

Considering the above-described fact, it is possible to express whether or not the chain state of the conflict is possible to occur, if the following two principles are accurately formulated.

(1'): Transfer lots in an original pile have to be "primarily" transferred in order from one located on an upper side (original pile decomposition constraint).

(2'): Transfer lots transferred to the same main pile have to be "secondarily" transferred in order from one that is to be located on a lower side of the main pile (main pile creation constraint).

For additional information, the point of this expression method is that the transfer in (1') is the "primary" transfer and the transfer in (2') is the "secondary" transfer. As described above, since "any transfer lot can be transferred to a main pile by only two transfer operations at the maximum," whether or not the temporary storage occurs (whether or not the transfer is necessary twice) depends on whether or not the "primary" transfer and the "secondary" transfer are the same. That is, at the time of the transfer of a transfer lot from an original pile to a main pile, when the transfer lot can be directly transferred, the "primary" transfer and the "secondary" transfer are the same. On the other hand, when the transfer lot is transferred to the main pile after being once temporarily stored, the "primary" transfer and the "secondary" transfer are different.

Therefore, the transfer of the transfer lot by decomposing the original pile is the primary transfer, and the transfer of the transfer lot to the main pile is the secondary transfer. Therefore, if (1') and (2') can be formulated, the chain state of the conflict, if any, is expressed, and by using them as constraint conditions and setting an appropriate objective function (for example, an objective function for minimizing the temporary storage time or the like) to solve the conflict, a solution where the initial (primary) transfer time and the final (secondary) transfer time do not coincide with each other in one of the transfer lots is derived, and therefore, it is found out that this lot is a target of the temporary storage.

Further, in this embodiment, by setting the transfer "time" not the transfer "order" as the variable unlike the art described in JP 2010-269929, it is possible to properly express the conflict between already arriving materials and materials to arrive whose arrival time matters.

As described above, in this embodiment, two continuous (not discrete) variables, that is, the initial (primary) transfer time and the final (secondary) transfer time are prepared for a given transfer lot, and they are used to set (1') and (2') as the constraint conditions and to set a reduction in the number of times the steel material is transferred (that is, a reduction in the number of temporary storage times) and a reduction in the temporary storage time and in the waiting time on the reception table as the objective (evaluation) function, which makes it possible to make an optimization problem regarding the transfer order of the transfer lots accompanied by the chain state of the conflict result in the mathematical programming problem, and to prepare "a desirable transfer plan" where the number of times the steel materials is transferred is small (that is, the number of temporary storage times is small) and the temporary storage time and the waiting time on the reception table are short, in the form of a solution of a mathematical problem, without taking a trouble of checking each conflict.

Example Embodiment

Hereinafter, one embodiment of the present invention will be described with reference to the drawings, with an inter-step storage space in a steel manufacturing process which is a metal manufacturing process being set as an inter-step storage space, and with a steel material being set as a metal material.

Figure 2:
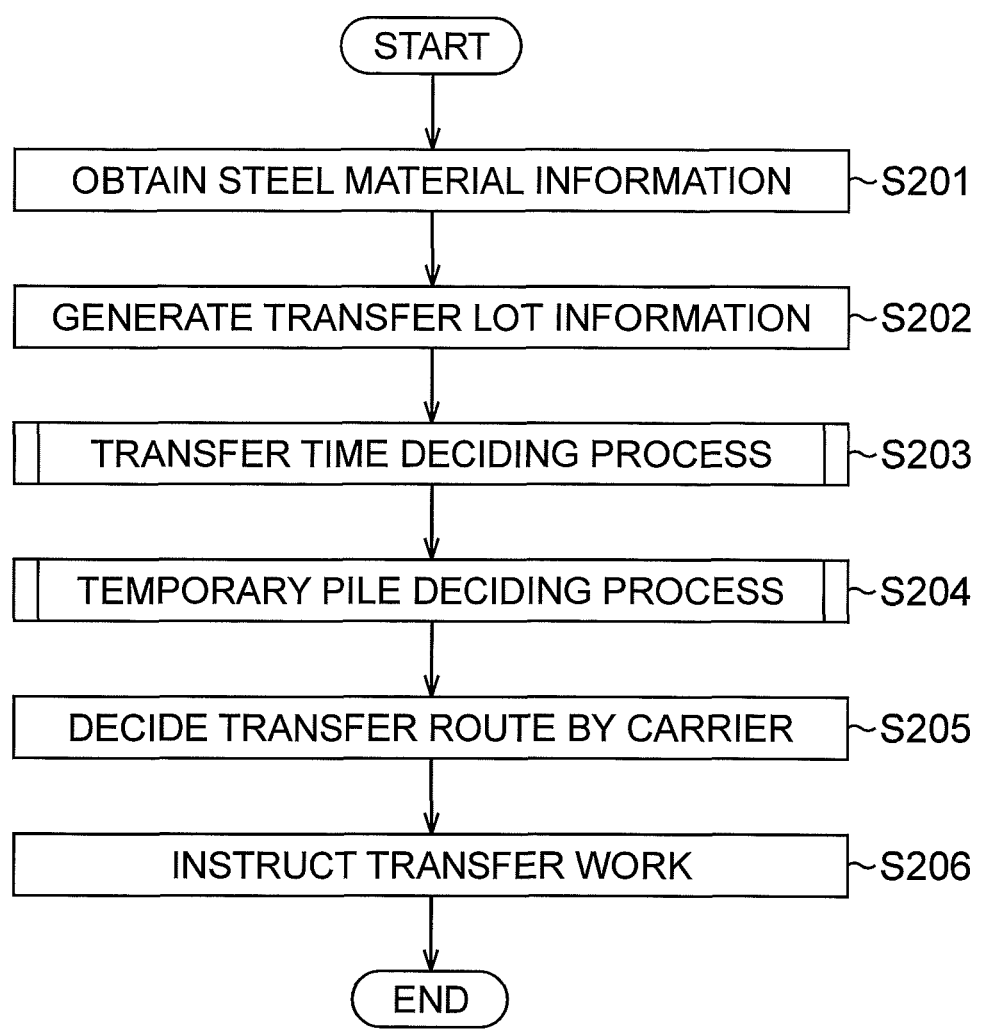
FIG. 2 is a flowchart to explain an example of processes performed by the yard management apparatus.
Figure 3:
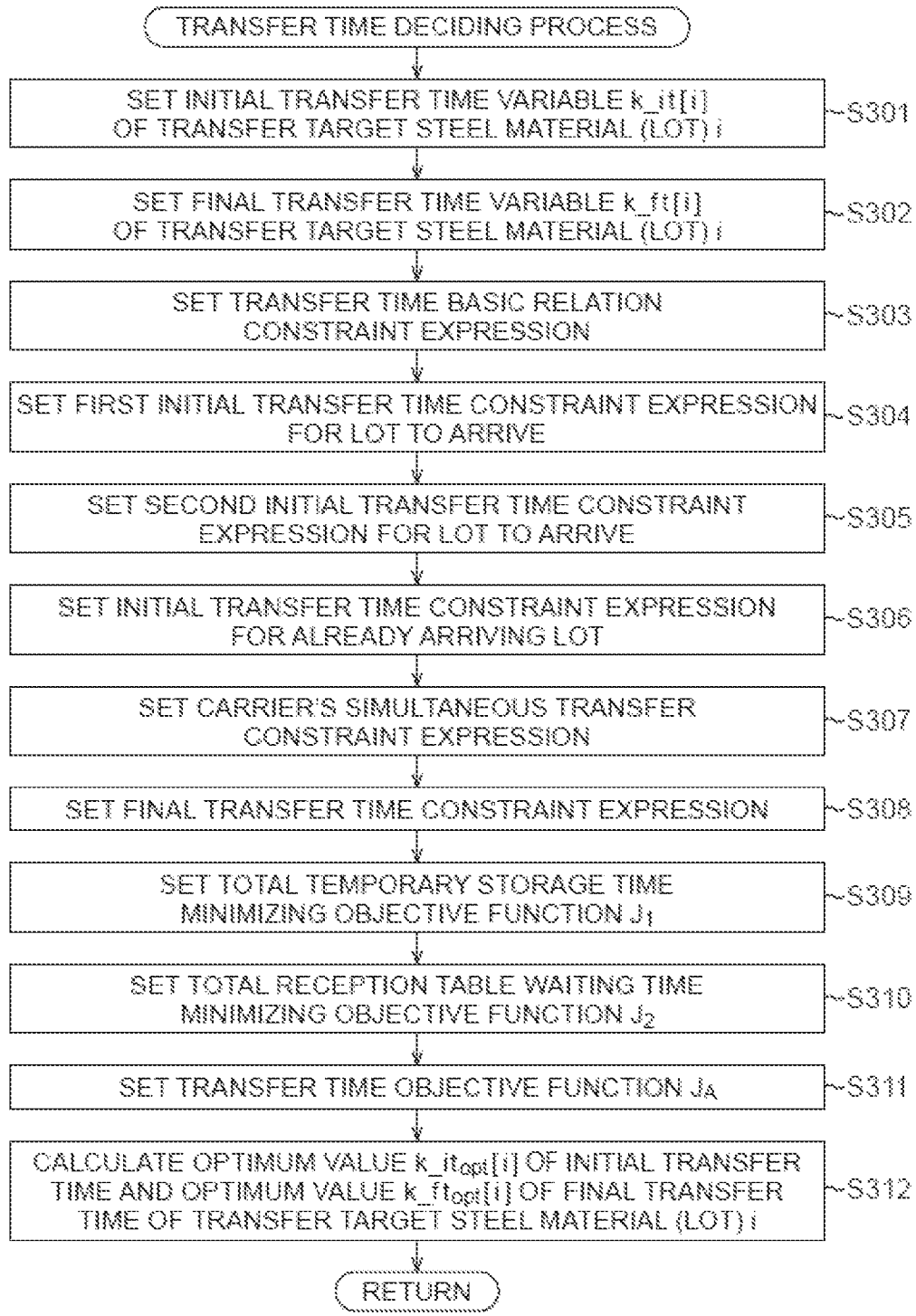
FIG. 3 is a flowchart to explain details of a transfer time deciding process at Step S203 in FIG. 2.
Figure 4:
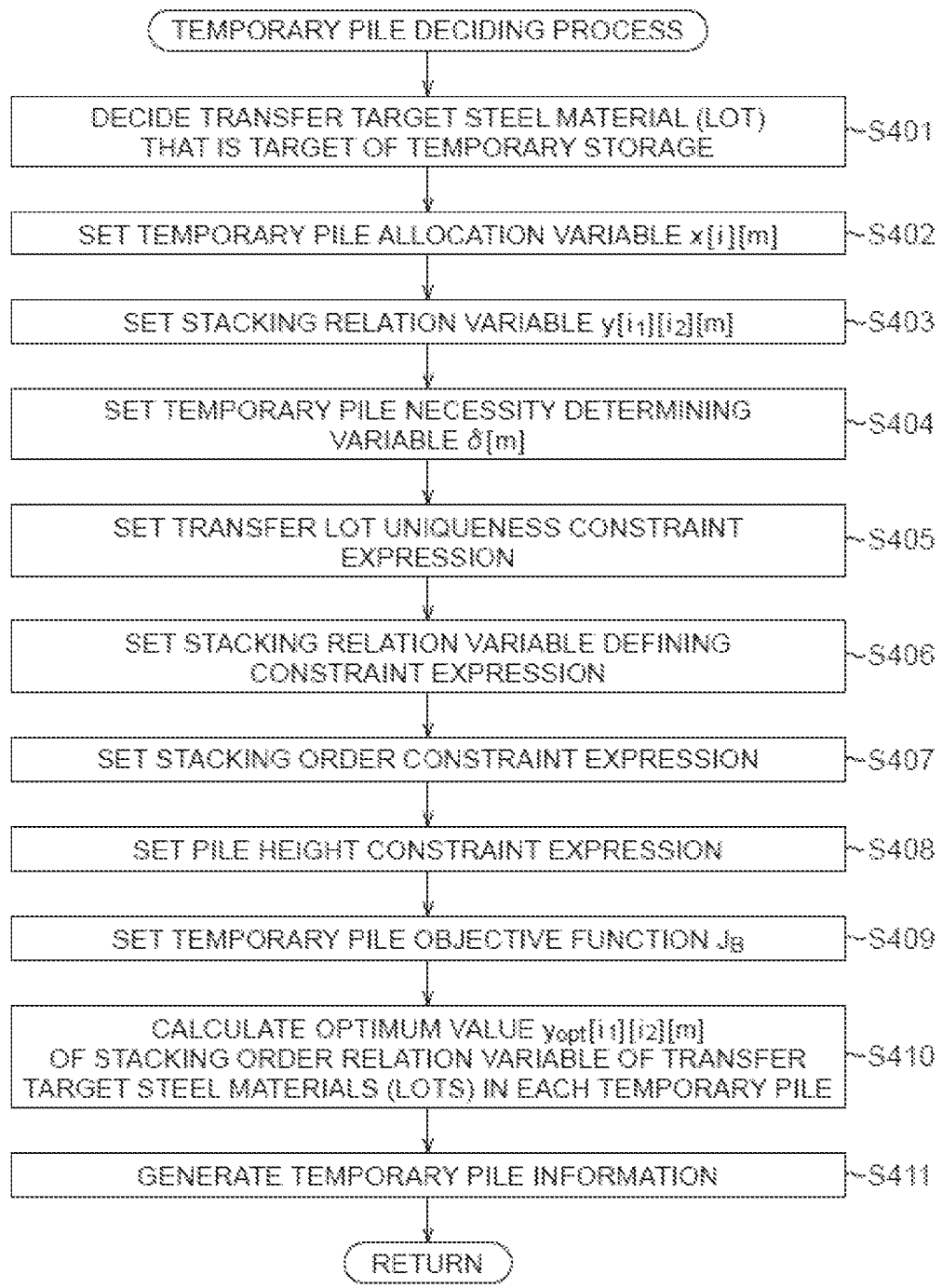
FIG. 4 is a flowchart to explain details of a temporary pile deciding process at Step S204 in FIG. 2.

FIG. 1 is a diagram showing an example of a functional structure of a yard management apparatus 100 in a steel-making process or the like of this embodiment. Hardware of the yard management apparatus can be realized by, for example, using a computer system (for example, a personal computer) including a CPU, a ROM, a RAM, a HDD, a communication interface, a user interface, and so on. Further, FIG. 2 is a flowchart to explain an example of processes performed by the yard management apparatus 100, FIG. 3 is a flowchart to explain details of a transfer time deciding process at Step S203 in FIG. 2, and FIG. 4 is a flowchart to explain details of a temporary pile deciding process at Step S204 in FIG. 2.

<Steel Material Information Obtaining Section 110 (Step S201)>

A steel material information obtaining section 110 receives steel material information regarding steel materials that are targets of pile sorting, from a steel management system computer 200 being database regarding the steel materials in general, such as a business computer. Specifically, the steel material information obtaining section 110 receives the steel material information including steel material identification information and information on a main pile number, a main pile stacking position, and a steel material size, regarding all the steel materials to be transferred. The main pile number is information specifying a main pile (delivery pile) to which a target steel material is transferred. The main pile stacking position is information indicating a stacking position of the steel material to be transferred in the main pile. Thus, in this embodiment, a main pile where each of the steel materials to be transferred is to be stacked and at which position from the top (bottom) of the main pile this steel material is to be stacked are set in advance. The steel material size is information on thickness, width, and length of the steel material.

Further, regarding already arriving materials being steel materials which have already arrived at a yard, the steel material information further includes information on an original pile number and an original pile stacking position. The original pile number is information specifying an original pile where a target steel material (already arriving material) is stacked. The original pile stacking position is information indicating a stacking position of the target steel material (already arriving material) in the original pile.

Further, when some steel materials are delivered during a time zone when the steel material that is a target of the pile sorting is received, information on the delivery times of these steel materials is received.

Figure 5:
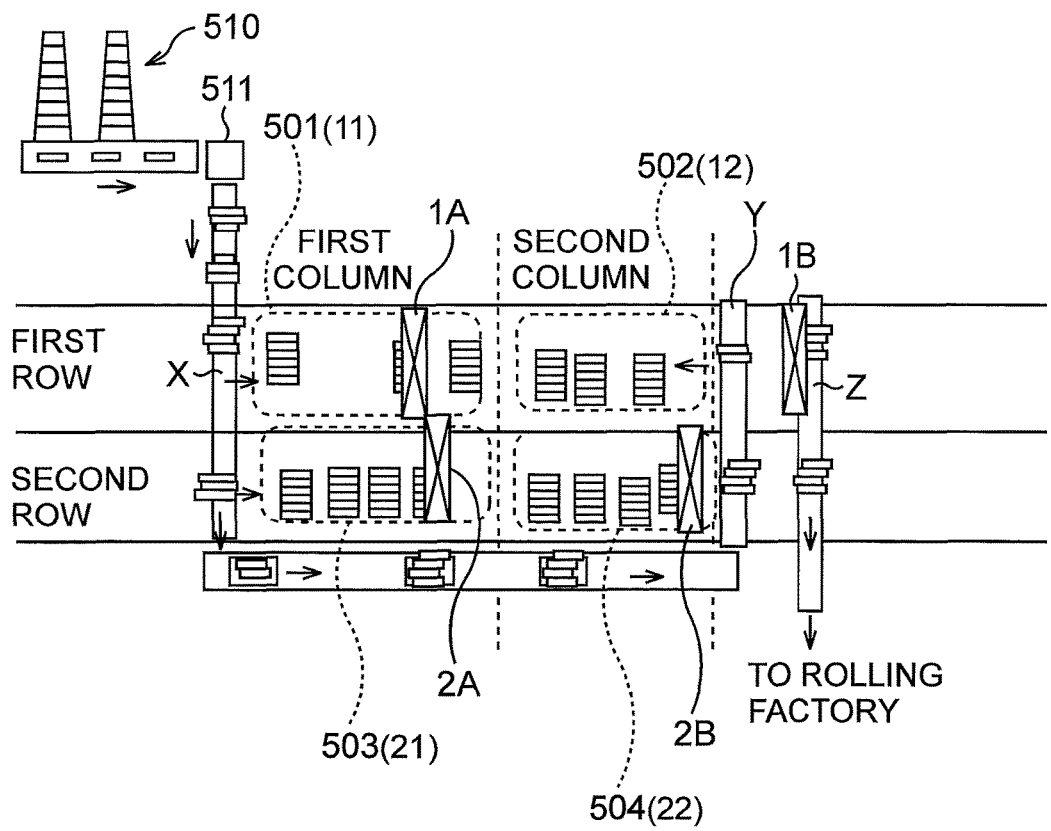
FIG. 5 is a view showing an example of layout of a yard.
Figure 6:
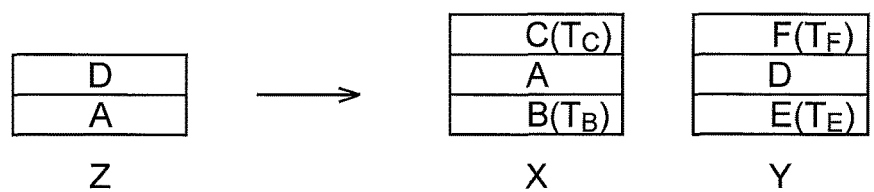
FIG. 6 is a view conceptually showing a first example of creating delivery piles by mixing steel materials to arrive and already arriving steel materials.
Figure 7:
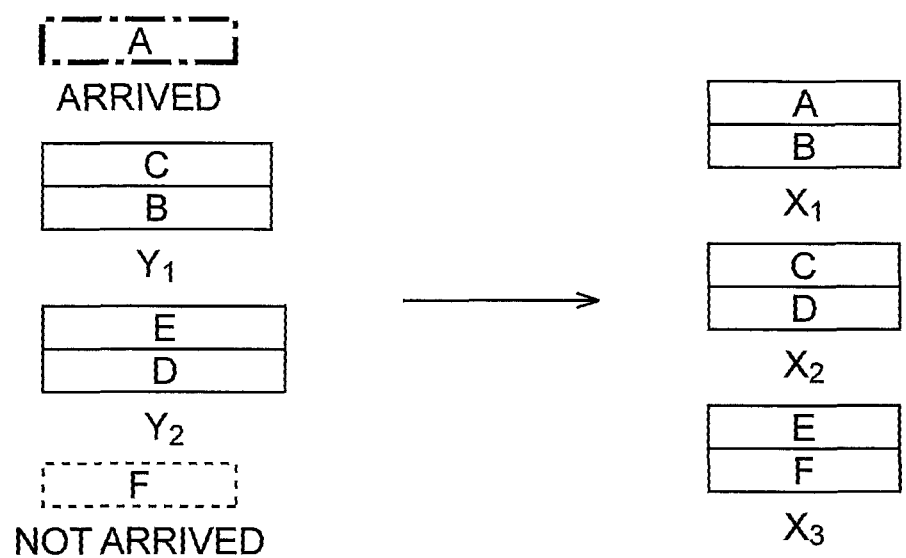
FIG. 7 is a view conceptually showing a second example of creating delivery piles by mixing steel materials to arrive and already arriving steel materials.

On the other hand, regarding materials to arrive being steel materials which have not yet arrived at the yard, the steel material information includes the scheduled arrival time at the reception table and stacking positions (stacking order) of the received steel materials on the reception table. The reception stacking position is information indicating stacking positions (stacking order) of the steel materials in a pile where the target steel materials are stacked, on a reception entrance (reception table X or Y (FIG. 5)).

Further, the steel material information obtaining section 110 receives, from the steel material management system computer 200, an adjustment coefficient Weight (refer to an expression (10)) for balancing later-described two objective functions $J_1$, $J_2$ and information on a vacant address in the yard, in addition to the steel material information. Here, the address is decided by a column and a row such as, for example, parenthesized (11), (12), (21), and (22) appended to storage spaces 501 to 504 in FIG. 5.

Based on the received steel material information, the steel material information obtaining section 110 discriminates a portion, in the original pile, having the same pile appearance as that of the main pile, and excludes the portion, in the original pile, having the same pile appearance as that of the main pile from the original pile (target of the following calculation). Specifically, the yard management apparatus 100 of this embodiment takes only a temporary stored portion temporarily stored at the present moment (portion different from the main pile) in the original pile, as a target of the calculation (optimization) of the transfer time. In the description below, one called "original pile" refers to the portion in the original pile except the portion having the same pile appearance as that of the main pile. Note that, in this embodiment, the steel material information obtaining section 110 excludes the portion, in the original pile, having the same pile appearance as that of the main pile. However, this is not always necessary. That is, the steel material management system computer 200 may exclude the portion, in the original pile, having the same pile appearance as that of the main pile and transmits, to the yard management apparatus 100, information on the remaining original pile as the information on the original pile.

When a carrier which transfers the steel materials in the yard can transfer two steel materials or more at a time, the steel material information obtaining section 110 outputs, to a later-described transfer lot information generating section 120, the steel material identification information and "the main pile number, the main pile stacking position, the original pile number • the original pile stacking position (or the scheduled arrival time • the reception stacking position), and the steel material size" linked to the steel material identification information.

On the other hand, when the carrier can transfer only one steel material at a time, the steel material information obtaining section 110 outputs the steel material identification information to a transfer time variable setting section 131.

Further, the steel material information obtaining section 110 outputs, to a transfer time constraint expression setting section 132, the steel material identification information and "the main pile number, the main pile stacking position, and the original pile number • the original pile stacking position (or the scheduled arrival time)" linked to the steel material identification information. Here, when there are steel materials to be delivered during a time zone when the steel material that is a target of the pile sorting is received, the steel material information obtaining section 110 outputs the delivery times of these steel materials (the delivery times linked to pieces of the steel material identification information of these steel materials) to the transfer time constraint expression setting section 132, together with the main pile number, the main pile stacking position, and the original pile number • the original pile stacking position (or the scheduled arrival time).

Further, the steel material information obtaining section 110 outputs the steel material identification information, "the original pile number • the original pile stacking position (or the scheduled arrival time)" linked to the steel material identification information, and the adjustment coefficient to a transfer time objective function setting section 133.

Further, the steel material information obtaining section 110 outputs, to a transfer work instruction generating section 150, the steel material identification information, "the main pile number, the main pile stacking position, and the original pile number • the original pile stacking position (or the scheduled arrival time)" linked to the steel material identification information, and the information on the vacant address in the yard.

Further, the steel material information obtaining section 110 outputs, to a temporary pile constraint expression setting section 142, the steel material information, "the main pile number, the main pile stacking position, the original pile number • the original pile stacking position (or the scheduled arrival time), and the steel material size" linked to the steel material identification information.

The steel material information obtaining section 110 obtains the aforesaid pieces of information from the steel material management system computer 200 at, for example, several minute intervals. Every time the information is taken into the steel material information obtaining section 110, the following sections activate.

The steel material information obtaining section 110 can be realized by, for example, the communication interface of the yard management apparatus 100 receiving the aforesaid pieces of information and by the CPU of the yard management apparatus 100 executing a program stored in the ROM or the like by using the RAM as a work area.

<Transfer Lot Information Generating Section 120 (Step S202)>

The transfer lot information generating section 120 activates when the carrier can transfer two steel materials or more at a time. From stacking appearance on the transfer table in the case of materials to arrive and from original pile appearance in the case of already arriving materials, the transfer lot information generating section 120 divides the steel materials having the stacking appearance into sets of the steel materials for the carrier such as a crane to transfer (that is, the transfer lots). The division to the transfer lots is performed based on the following rule, for instance.

Specifically, the transfer lot information generating section 120 checks the stacking order in order from a steel material on the top tier toward a lower tier of a stack (pile) being a target of the transfer, and a range where the checked stacking order agrees with the stacking order in the main pile and which can be grasped by the carrier in view of weight and size is set as one transfer unit (transfer lot). Here, the range that can be grasped means a limited range of the weight and thickness that the carrier can transfer (for example, that can be hung from the crane). Then, the transfer lot information generating section 120 performs the same operation starting from a steel material subsequent to (steel material on a lower side of) the final steel material (steel material on the lowest tier) in the unit which is set as the transfer unit by the above-described operation of generating (classifying into) the transfer unit (transfer lot), and generates a new transfer lot again. The transfer lot information generating section 120 repeats such an operation until a transfer lot including a steel material on the lowest tier of the stack (pile) that is the target of the transfer is generated. Further, the transfer lot information generating section 120 performs the above operation individually for all of piles on the reception table and original piles in the yard.

The transfer lot information generating section 120 divides the steel materials in the stack that is the target of the transfer, into the plural transfer lots in the above-described manner.

Note that, when the carrier can transfer only one steel material at a time, each transfer lot is composed of one steel material.

The transfer lot information generating section 120 can be realized by, for example, the CPU of the yard management apparatus 100 executing a program stored in the ROM or the like by using the RAM as a work area.

<Transfer Time Deciding Section 130 (Step S203)>

A transfer time deciding section 130 decides optimum values $k\_it_{opt}[i]$, $k\_ft_{opt}[i]$ of the initial (primary) transfer time $k\_it[i]$ and the final (secondary) transfer time $k\_ft[i]$ for all the steel materials (or transfer lots) i to be transferred. As functions therefor, the transfer time deciding section 130 includes the transfer time variable setting section 131, the transfer time constraint expression setting section 132, the transfer time objective function setting section 133, and a transfer time optimum solution calculating section 134. Hereinafter, examples of the functions that the respective sections have will be described. Note that, in the following description, "the steel material (or transfer lot) i to be transferred" will be called "the transfer target steel material (lot) i" when necessary.

[Transfer Time Variable Setting Section 131 (Steps S301, S302)]

When the carrier can transfer only one steel material at a time, the transfer time variable setting section 131 obtains the steel material identification information from the steel material information obtaining section 110. On the other hand, when the carrier can transfer two steel materials or more at a time, the transfer time variable setting section 131 obtains the transfer lot identification information from the transfer lot information generating section 120.

Then, the transfer time variable setting section 131 decides decision variables which serve as variables in later-described optimization calculation in the following manner.

(i) Initial Transfer Time ($k\_it[i]$) of Target Steel Material (Lot) i

For a material to arrive, the time when its transfer to the yard is first started (the time when its temporary storage or main storage is started) after it arrives at the reception entrance such as the reception table is the initial transfer time ($k\_it[i]$) of the transfer target steel material (lot) i. On the other hand, for an already arriving material, the time when its transfer from a place where it is placed at the present time is first started is the initial transfer time ($k\_it[i]$) of the transfer target steel material (lot) i.

(ii) Final Transfer Time ($k\_ft[i]$) of Transfer Target Steel Material (Lot) i

For the transfer target steel material (lot) i, the time when its transfer to the main pile (delivery pile) is started (the time when its main storage is started) is the final transfer time ($k\_ft[i]$) of the transfer target steel material (lot) i.

The transfer time variable setting section 131 gives the steel material identification information or the transfer lot identification information to i of the initial transfer time ($k\_it[i]$) and the final transfer time ($k\_ft[i]$) of the transfer target steel material (lot) i, thereby setting the initial transfer time ($k\_it[i]$) and the final transfer time ($k\_ft[i]$) of the transfer target steel material (lot) i. Consequently, "the initial transfer time ($k\_it[i]$) and the final transfer time ($k\_ft[i]$) of the transfer target steel material (lot) i" in the same number as the number of the transfer target steel materials (lots) i are generated.

The transfer time variable setting section 131 can be realized by, for example, the CPU of the yard management apparatus 100 executing a program stored in the ROM or the like by using the RAM as a work area.

[Transfer Time Constraint Expression Setting Section 132 (Steps S303 to S308)]

The transfer time constraint expression setting section 132 sets the following basic transfer constraint expressions that are to be satisfied by the decision variables ($k\_it[i]$, $k\_ft[i]$) set (defined) by the transfer time variable setting section 131 (that are pertaining to the definition of the variables).

(i) Transfer Time Basic Relation Constraint (Step S303)

The transfer time basic relation constraint represents a basic relation between the initial transfer time ($k\_it[i]$) and the final transfer time ($k\_ft[i]$) of the transfer target steel material (lot) i. Concretely, the transfer time basic constraint is a constraint defining the relation of the both, that for any of the transfer target steel materials (lots) i, the initial transfer time variable ($k\_it[i]$) is not later than the final transfer time variable ($k\_ft[i]$). Therefore, a transfer time basic relation constraint expression is represented by the following expression (1).

For a given transfer lot i, $$k\_it[i] \leq k\_ft[i] \qquad (1)$$

As described previously, when the transfer lot i can be directly transferred to the main pile, the initial transfer time variable $k\_it[i]$ and the final transfer time variable $k\_ft[i]$ are the same. That is, the equal sign in the expression (1) is valid.

The transfer time constraint expression setting section 132 gives the expression (1) the decision variables (k_it[i], k_ft[i]) set (defined) by the transfer time variable setting section 131, thereby setting the transfer time basic relation constraint expression.

(ii) First Initial Transfer Time Constraint Expression for Lot to Arrive (Step S304)

A first initial transfer time constraint for lot to arrive is a constraint of the initial transfer time k_it[i] based on the "scheduled arrival time at the reception table" of a transfer target steel material (lot) i to arrive. Concretely, the first initial transfer time constraint for lot to arrive is a physical constraint of the initial transfer time k_it[i] that the transfer target steel material (lot) i to arrive can be initially transferred to the yard only at or after the reception time (the arrival time at the reception entrance (for example, the reception table) of the yard from an upstream step). Therefore, a first initial transfer time constraint expression for lot to arrive is expressed by the following expression (2).

$$k\_it[i] \geq arrival\_t(i) \quad (2)$$

In the expression (2), arrival_t(i) is the scheduled arrival time of the transfer target steel material (lot) i at the reception table. As described above, arrival_t(i) is obtained in advance by the steel material information obtaining section 110.

The transfer time constraint expression setting section 132 gives the expression (2) the decision variable for the transfer target steel material (lot) i to arrive out of the decision variables (k_it[i], k_ft[i]), which are set (defined) by the transfer time variable setting section 132, and its scheduled arrival time arrival_t(i) at the reception table received from the steel material information obtaining section 110, thereby setting the first initial transfer time constraint expression for lot to arrive.

(iii) Second Initial Transfer Time Constraint Expression for Lot to Arrive (Step S305)

A second initial transfer time constraint for lot to arrive is a constraint of the initial transfer time k_it[i] based on the initial reception order of the transfer target steel materials (lots) i to arrive. The initial reception of the transfer target steel material (lot) i to arrive is a transfer process performed immediately after the arrival, and generally, the arrival order on the reception table serving as the reception entrance cannot be changed. Therefore, this embodiment adopts, as the second initial transfer time constraint for lot to arrive, a constraint that the initial transfer time k_it[i] is restricted by the arrival order. A second initial transfer constraint expression for lot to arrive is represented by the following expression (3).

$$k\_it[i_x] + transf\_time \leq k\_it[i_{x+1}] \quad (3)$$

In the expression (3), transf_time is the time required for the transfer by the carrier. In this embodiment, as the required transfer time transf_time by the carrier, an average transfer time per one transfer by the carrier is stored in the yard management apparatus 100 in advance. Further, in the expression (3), a transfer target steel material (lot) to arrive which arrives next to the transfer target steel material (lot) $i_x$ to arrive is represented by $i_{x+1}$.

The transfer time constraint expression setting section 132 gives the expression (3) the decision variables for the transfer target steel materials (lots) i to arrive out of the decision variables (k_it[i], k_ft[i]), which are set (defined) by the transfer time variable setting section 131, and the required transfer time (transf_time) by the carrier, thereby setting the second initial transfer time constraint expression for lot to arrive.

(iv) Initial Transfer Time Constraint Expression for Already Arriving Lot (Step S306)

An initial transfer time constraint for already arriving lot is a constraint of the initial transfer time k_it[i] based on the initial transfer order of transfer target steel materials (lots) i which have already arrived. Concretely, the initial transfer time constraint for already arriving lot is a constraint that the initial transfer order of the already arriving transfer target steel materials (lots) i whose original pile is the same is restricted by the stacking order in the original pile (that is, the initial transfer (decomposition) can be started only from the transfer target steel material (lot) located on the top in an original pile $m_x$). Therefore, an initial transfer time constraint expression for already arriving lot is represented by the following expression (4).

$$k\_it[m_{x\ i}] + transf\_time \leq k\_it[m_{x\ i+1}] \quad (4)$$

In the expression (4), among the already arriving transfer target steel materials (lots) i having a vertical relation in the same original pile $m_x$, one located on an upper side is represented by $m_{x\ i}$ and one located on a lower side thereof is represented by $m_{x\ i+1}$.

The transfer time constraint expression setting section 132 gives the expression (4) the decision variables for the already arriving transfer target steel materials (lots) i out of the decision variables (k_it[i]), which are set (defined) by the transfer time variable setting section 131, and the required transfer time (transf_time) by the carrier, thereby setting the initial transfer time constraint expression for already arriving lot.

(v) Carrier's Simultaneous Transfer Constraint Expression (Step S307)

A carrier's simultaneous transfer constraint (transfer overlap preventing constraint expression) is a constraint regarding the simultaneous transfer based on the number of the carriers. Concretely, the carrier's simultaneous transfer constraint is a constraint that the number of the transfer target steel materials (lots) i simultaneously transferred during a given time zone cannot exceed the number of the carriers.

The transfer processes of the steel materials in the yard include three transfer processes, namely, a reception process (reception transfer process from a pre-step to the yard), a relocation process (transfer process in the yard), and a delivery process (delivery transfer process from the yard to a post-step). Normally, the yard is divided into a plurality of rows, and in each row, these processes are performed by one carrier (mainly, crane) or two. When there is only one carrier (crane), the reception process and the relocation process cannot be performed simultaneously, and therefore, it is necessary to express this as a constraint.

Further, since the plural relocation processes cannot be performed simultaneously, it is necessary to express this as a constraint.

Incidentally, the constraint for preventing the overlap of the reception processes is realized by (iii) the second initial transfer time constraint for lot to arrive (the constraint that the initial transfer time k_it[i] is restricted by the arrival order) (refer to the expression (3)) described above.

Further, the constraint for preventing the overlap of the transfer processes of the already arriving transfer target steel materials (lots) i forming the same original pile is realized by the initial transfer time constraint for already arriving lot (the constraint that the initial transfer order of the already arriving transfer target steel materials (lots) i whose original pile is the same is restricted by the stacking order in the original pile) (refer to the expression (4)).

Therefore, it is necessary to express constraints for preventing the transfer overlap regarding the transfers of the material to arrive and the already arriving material and the transfers of the already arriving materials in different original piles.

Here, the transfer target steel materials (lots) to arrive are represented by $i_1, i_2, \ldots, i_{ni}$. Original piles being already arriving transfer target steel materials (lots) are represented by $m_1, m_2$. The already arriving transfer target steel materials (lots) forming the original pile $m_1$ are represented by $m_{11}, m_{12}, m_{1m1}$ from the top of the original pile $m_1$, and the already arriving transfer target steel materials (lots) forming the original pile $m_2$ are represented by $m_{21}, m_{22}, \ldots, m_{2m2}$ from the top of the original pile $m_2$. Further, it is assumed that there is only one carrier for transferring them. Under this condition, the constraint for preventing the transfer overlap can be expressed as follows.

Here, as an example, constraint expressions for preventing the overlap of the initial transfer of the transfer target steel material (lot) $i_1$ to arrive and the initial transfer of the already arriving transfer target steel material (lot) $m_{11}$ are shown.

First, a time zone of the initial transfer of the transfer target steel material (lot) $i_1$ to arrive is time $k\_it[i_1]$ to time $k\_it[i_1]$+ transf_time. On the other hand, a time zone of the initial transfer of the already arriving transfer target steel material (lot) $m_{11}$ is time $k\_it[m_{11}]$ to time $k\_it[m_{11}]$+ transf_time. In order to prevent the overlap of the both transfer time zones, $k\_it[i_1]$ and $k\_it[m_{11}]$ are decided so that the following condition 1 or condition 2 (expression (5-1) or expression (5-2)) holds.

Condition 1

When the transfer target steel material (lot) to arrive is transferred after the already arriving transfer target steel material (lot) $m_{11}$ is transferred, the following expression (5-1) needs to hold.

$$k\_it[m_{11}]+\text{transf\_time} \leq k\_it[i_1] \quad (5\text{-}1)$$

Condition 2

When the already arriving transfer target steel material (lot) $m_{11}$ is transferred after the transfer target steel material (lot) $i_1$ to arrive is transferred, the following expression (5-2) needs to hold.

$$k\_it[i_1]+\text{transf\_time} \leq k\_it[m_{11}] \quad (5\text{-}2)$$

These condition 1 and condition 2 are formulated as a mathematical programming problem. For this purpose, the following 1-0 variables $\delta[i_1][m_{11}]$, $\delta[m_{11}][i_1]$ are defined.

First, as $\delta[i_1][m_{11}]$, the 1-0 variable is defined so that the expression (5-1) ($k\_it[m_{11}]$+ transf_time $\leq k\_it[i_1]$) always holds when its value is "1" ($\delta[i_1][m_{11}]=1$) ($\delta[i_1][m_{11}]=1 \rightarrow k\_it[m_{11}]$+ transf_time$\leq k\_it[i_1]$).

Further, as $\delta[m_{11}][i_1]$, the 1-0 variable is defined so that the expression (5-2) ($k\_it[i_1]$+ transf_time$\leq k\_it[m_{11}]$) always holds when its value is "1" ($\delta[m_{11}][i_1]=1$) ($\delta[m_{11}][i_1]=1 \rightarrow k\_it[i_1]$+ transf_time$\leq k\_it[m_{11}]$).

If the 1-0 variables $\delta[i_1][m_{11}]$, $\delta[m_{11}][i_1]$ can be thus defined, it is only necessary to use a constraint expression of the following expression (6-1) in order for one of the condition 1 and the condition 2 to always hold. Further, as inequality constraint expressions for defining the 1-0 variables $\delta[i_1][m_{11}]$, $\delta[m_{11}][i_1]$, an expression (6-2) and an expression (6-3) can be used.

$$\delta[i_1][m_{11}]+\delta[m_{11}][i_1] \geq 1 \quad (6\text{-}1)$$

$$(k\_it[m_{11}]+\text{transf\_time})-k\_it[i_1] \leq M\_t \times (1-\delta[i_1][m_{11}]) \quad (6\text{-}2)$$

$$(k\_it[i_1]+\text{transf\_time})-k\_it[m_{11}] \leq M\_t \times (1-\delta[m_{11}][i_1]) \quad (6\text{-}3)$$

In the expression (6-2) and the expression (6-3), M_t is a large value exceeding the total time required for performing the transfer this time. In this embodiment, this value is stored in the yard management apparatus 100 in advance.

The expression (6-2) becomes the expression (5-1), if the value of the 1-0 variable $\delta[i_1][m_{11}]$ therein is "1". Therefore, the condition 1 is expressed by the expression (6-2). The expression (6-3) becomes the expression (5-2) if the value of the 1-0 variable $\delta[m_{11}][i_1]$ therein is "1". Therefore, the condition 2 is expressed by the expression (6-3). Then, if the value of one of the 1-0 variables $\delta[i_1][m_{11}]$ and $\delta[m_{11}][i_1]$ is "1", it is expressed that the condition 1 or the condition 2 holds, by the constraint expression of the expression (6-1).

The above expressions are the constraint expressions for preventing the temporal overlap of the initial transfer of the transfer target steel material (lot) $i_1$ to arrive and the initial transfer of the already arriving transfer target lot $m_{11}$.

The transfer time constraint expression setting section 132 gives the decision variables ($k\_it[i_1]$, $k\_it[m_{11}]$) set (defined) by the transfer time variable setting section 131, the required transfer time (transf_time) by the carrier, the steel material identification information of the transfer target steel material (lot) $i_1$ to arrive, and the steel material identification information of the already arriving transfer target steel material (lot) $m_{11}$ to the expression (6-1) to the expression (6-3), thereby setting the carrier's simultaneous transfer constraint expressions.

The transfer time constraint expression setting section 132 sets such carrier's simultaneous transfer constraint expressions for all the combinations of the transfer target steel materials (lots) $i_1, i_2, \ldots, i_{ni}$ to arrive and the already arriving transfer target steel materials (lots) $m_{11}, m_{12}, \ldots, m_{1m1}$, and $m_{21}, m_{22}, \ldots, m_{2m2}$. Consequently, it is possible to set the constraint expressions for preventing the temporal overlap of the initial transfers for all the combinations of the transfer target steel materials (lots) to arrive and the already arriving transfer target lots. Incidentally, these constraint expressions are different only in the expression (6-1) to the expression (6-3) and the variables, and therefore detailed description thereof will be omitted.

Further, the transfer time constraint expression setting section 132 sets such carrier's simultaneous transfer constraint expressions also for all the combinations of all the already arriving transfer target steel materials (lots) $m_{11}, m_{12}, \ldots, m_{1m1}$ and $m_{21}, m_{22}, \ldots, m_{2m2}$. Consequently, regarding all the combinations of the different already arriving transfer target steel materials (lots), it is possible to set the constraint expressions for preventing the temporal overlap of their initial transfers. Incidentally, these constraint expressions are different only in the expression (6-1) to the expression (6-3) and the variables, and therefore detailed description thereof will be omitted.

Further, when the delivery and the reception are performed by the same carrier, it is necessary to set the same constraints as the expression (5-1) and the expression (5-2) in order to prevent the overlap of the delivery and the reception. Normally, the delivery time is decided by the schedule of the post-step, and therefore, let the scheduled delivery start time of a steel material j (j=1, . . . , J) scheduled to be delivered be $k\_out\_j$ (given), in order to prevent the overlap of the reception of the transfer target steel material (lot) i to arrive and the delivery at the delivery start time k_out_j in a relevant time zone, for instance, constraint expressions such as the following expression (5-3) and expression (5-4) are set for the combination of the given transfer target steel material (lot) i and the given steel material j scheduled to be delivered, and constraint expressions corresponding to the expression (6-1) to the expression (6-3) are set so that one of these constraint expressions holds, similarly to the above.

$$k\_out\_j + \text{transf\_time} \leq k\_it[i] \quad (5\text{-}3)$$

$$k\_it[i] + \text{transf\_time} \leq k\_out\_j \quad (5\text{-}4)$$

(vi) Final Transfer Time Constraint Expression (Step S308)

A final transfer time constraint is a constraint of the final transfer time k_ft[i] based on the final transfer order. The configuration (stacking) in the main pile (delivery pile) has to be started from the bottom also in a physical point of view. Therefore, as the final transfer time constraint, this embodiment adopts a constraint that the final transfer time k_ft[i] of each steel material (transfer lot) forming the main pile (delivery pile) becomes earlier for the steel material located on a lower position in the stacking order. That is, the final transfer time constraint is a constraint that the final transfer order of the steel materials (transfer lots) in the same main pile (delivery pile) is restricted by the stacking appearance of the main pile (stacking order therein) (a physical constraint that the final transfer (stacking) can be done only from the bottom of the main pile). A final transfer time constraint expression is represented by an expression (7).

$$k\_ft[m_{x+1}] + \text{transf\_time} \leq k\_ft[m_x] \quad (7)$$

In the expression (7), out of the transfer target steel materials (lots) i having a vertical relation in the same main pile (delivery pile), one on an upper side is represented by $m_x$ and one on a lower side thereof is represented by $m_{x+1}$.

The transfer time constraint expression setting section 132 sets the final transfer time constraint expression by giving the expression (7) the decision variables (k_ft[i]) set (defined) by the transfer time variable setting section 131 and the required transfer time (transf_time) by the carrier.

The transfer time constraint expression setting section 132 can be realized by, for example, the CPU of the yard management apparatus 100 executing a program stored in the ROM or the like by using the RAM as a work area.

<Transfer Time Objective Function Setting Section 133 (Steps S309 to S311)>

The transfer time objective function setting section 133 sets a transfer time objective function $J_4$. In this embodiment, the transfer time objective function $J_4$ is expressed by a weighted linear sum of the total temporary storage time minimizing objective function $J_1$ being an objective function for shortening the total temporary storage time and the total reception table waiting time minimizing objective junction $J_2$ being an objective function for shortening the total waiting time on the reception table of the transfer target steel materials (lots) to arrive. Thus, in this embodiment, the total temporary storage time and the total waiting time on the reception table of the transfer target steel materials (lots) to arrive are the time during which the transfer target steel materials stay in a course of being transferred to the main pile.

Here, an intention to shorten the total temporary storage time will be described.

First, in order to reduce the number of the transfer target steel materials (lots) that are temporary stored and efficiently transfer the transfer target steel materials (lots), it is necessary to shorten the total temporary storage time.

Next, when the temporary storage time becomes long, it is necessary to reserve a space where to temporarily store the transfer target steel material (lot), which causes a lack of space in the yard which generally does not have much space allowance. Because of this as well, it is necessary to shorten the total temporary storage time.

Further, while the transfer target steel material (lot) is temporarily stored, the main pile including this transfer target steel material (lot) is not completed, and therefore, the transfer target steel materials (lots) belonging to this main pile are in a state of being divided into a portion forming the main pile and a portion not forming the main pile. Therefore, according to the number of these divided portions, the number of the steel materials on the upper most surfaces and the lower most surfaces increase. Therefore, a decrease of a temperature of the steel materials becomes larger than that when they are not divided into the portions included and not included in the main pile (when the main pile is completed). Further, since the space where to temporarily store the transfer target steel materials (lots) is generally outside a heat-retention vehicle, a temperature decrease caused by this occurs. Because of these, it is necessary to shorten the total temporary storage time.

Next, an intention to reduce the waiting time of the transfer target steel materials (lots) to arrive on the reception table will be described.

Firstly, problematic phenomena in the yard include an adverse effect that the congestion on the reception table has on an upstream step. In a yard located between a steel-making step and a hot-rolling step, a poor method of the reception to the yard results in a state where steel materials from the steel-making being the upstream step cannot be received due to the congestion on the reception table even if there is vacancy (space) in the yard, causing the occurrence of a situation where the steel-making is forced to be stopped in the worst case. When the number of the carriers installed in each row is small, it can easily occur that capacity allowing the steel materials to stay on the reception table is exceeded while the carriers are used for the delivery process and the relocation process. Therefore, it is necessary to prevent the occurrence of the congestion of the steel materials on the reception table in advance by adjusting these process works and reducing the total waiting time on the reception table as much as possible. Because of this, it is necessary to reduce the waiting time of the transfer target steel materials (lots) to arrive on the reception table.

(i) Total Temporary Storage Time Minimizing Objective Function $J_1$ (Step S309)

The temporary storage time can be expressed by a difference between the final transfer time k_ft[i] and the initial transfer time k_it[i] which are set as the decision variables. Therefore, the total temporary storage time minimizing objective function $J_1$ being an objective function for shortening the total temporary storage time can be found by adding the differences between the final transfer time k_ft[i] and the initial transfer time k_it[i] of all the transfer target steel materials (lots) i which have not yet arrived and which have already arrived. That is, the total temporary storage time minimizing objective function $J_1$ is expressed by the following expression (8).

[Formula 1]

$$J_1 = \sum_{i=1}^{N} (k\_ft[i] - k\_it[i]) \quad (8)$$

The transfer time objective function setting section 133 gives the expression (8) the total number N of all the transfer target steel materials (lots) i which have not yet arrived and which have already arrived and the decision variables (k_it[i], k_ft[i]) set (defined) by the transfer time variable setting section 131, thereby setting the total temporary storage time minimizing objective function $J_1$. Note that, regarding the transfer target steel material (lot) that can be directly transferred to the main pile, the final transfer time k_ft[i] and the initial transfer time k_it[i] are equal.

(ii) Total Reception Table Waiting Time Minimizing Objective Function $J_2$ (Step S310)

The waiting time of the transfer target steel material (lot) to arrive on the reception table is the time until the transfer target steel material (lot) is transferred into the yard after arriving at the reception table. Therefore, the total reception table waiting time minimizing objective function $J_2$ being an objective function for reducing the total waiting time of the transfer target steel materials (lots) to arrive on the reception table can be expressed by differences between the initial transfer time k_it[i] and the scheduled arrival time at the reception table. Therefore, the total reception table waiting time minimizing objective function $J_2$ can be found by adding the differences between the initial transfer time k_it[i] and the scheduled arrival time at the reception table, of all the transfer target steel materials (lots) i to arrive. That is, the total reception table waiting time minimizing objective function $J_2$ is expressed by the following expression (9).

[Formula 2]

$$J_2 = \sum_{i \in A} (k\_it[i] - arrival\_t(i)) \quad (9)$$

In the expression (9), A represents a set of i corresponding to the transfer target steel materials (lots) to arrive. The transfer time objective function setting section 133 gives the expression (9) this set A, the decision variables (k_it[i]) set (defined) by the transfer time variable setting section 131, and the scheduled arrival times arrival_t(i) at the reception table received from the steel material information obtaining section 110, thereby setting the total reception table waiting time minimizing function $J_2$.

(iii) Transfer Time Objective Function $J_A$ (Step S311)

As described above, the transfer time objective function $J_A$ is expressed by the weighted linear sum of the total temporary storage time minimizing objective function $J_1$ and the total reception table waiting time minimizing objective function $J_2$, in order to adjust the balance between the minimization of the total temporary storage time and the minimization of the total waiting time on the reception table. Therefore, in this embodiment, the transfer time objective function $J_A$ is expressed by the following expression (10) by using the adjustment coefficient Weight for balancing the objective functions.

$$J_A = Weight \times J_1 + J_2 \quad (10)$$

The transfer time objective function setting section 133 gives the expression (10) "the adjustment coefficient Weight for balancing the objective functions" received from the steel material information obtaining section 110 and "the total temporary storage time minimizing objective function $J_1$ and the total reception table waiting time minimizing objective function $J_2$" which are set in the above-described manner, thereby setting the transfer time objective function $J_A$.

The transfer time objective function setting section 133 can be realized by, for example, the CPU of the yard management apparatus 100 executing a program stored in the ROM or the like by using the RAM as a work area.

<Transfer Time Optimum Solution Calculating Section 134 (Step S312)>

The transfer time optimum solution calculating section 134 calculates the decision variables (k_it[i] and k_ft[i]) so that the value of the transfer time objective function $J_A$ set by the transfer time objective function setting section 133 is minimized within a range satisfying the transfer constraint expressions (the expression (1) to the expression (4), the expression (6-1) to the expression (6-3), and the expression (7)) set by the transfer time constraint expression setting section 132. The decision variables thus calculated become the optimum value (k_it$_{opt}$[i]) of the initial (primary) transfer time and the optimum value (k_ft$_{opt}$[i]) of the final (secondary) transfer time. Note that the calculation of the optimum solution can be realized by using, for example, a known mixed integer programming problem solution "solver."

The transfer time optimum solution calculating section 134 can be realized by, for example, the CPU of the yard management apparatus 100 executing a program stored in the ROM or the like by using the RAM as a work area.

<Temporary Pile Deciding Section 140 (Step S204)>

As will be describe later, the transfer work instruction generating section 150 decides the transfer order of the transfer target steel materials (lots) based on "the optimum values (k_it$_{opt}$[i]) of the initial (primary) transfer time and the optimum values (k_ft$_{opt}$[i]) of the final (secondary) transfer time" calculated by the transfer time optimum solution calculating section 134 (Step S312 in FIG. 3). At this time, the transfer target steel materials (lots) i whose optimum values (k_ft$_{opt}$[i]) of the final (secondary) transfer time become less than the optimum values (k_it$_{opt}$[i]) of the initial (primary) transfer time (k_it$_{opt}$[i]<k_ft$_{opt}$[i]) are regarded as targets of the temporary storage. Therefore, for these transfer target steel materials (lots) i, it is necessary to decide the temporary pile being a temporary storage space.

For this purpose, a method of creating different temporary piles for the respective transfer target steel materials (lots) i that are the targets of the temporary storage can be thought as the simplest method.

However, in this method, the same number of spaces for the temporary piles as the number of the transfer target steel materials (lots) i which need to be temporary stored are necessary. As described above, considering that the yard generally does not have much allowance for the storage space, this method cannot be necessarily said as an appropriate method. Therefore, in view of reducing the storage space, it is desirable to combine the transfer target steel materials (lots) i as much as possible to form the temporary piles. This requires some measure for reducing the total number of the temporary piles as much as possible.

Therefore, in this embodiment, for the transfer target steel materials (lots) i that are the targets of the temporary storage, a temporary pile deciding section 140 decides an optimum value (y$_{opt}$[i$_1$][i$_2$][m]) of a stacking relation variable (y[i$_1$][i$_2$][m]) expressing the stacking order in the temporary pile.

As functions therefor, the temporary pile deciding section 140 includes a temporary pile variable setting section 141, the temporary pile constraint expression setting section 142, a temporary pile objective function setting section 143, and a temporary pile optimum solution calculating section 144. Hereinafter, examples of the functions that these sections have will be described.

[Temporary Pile Variable Setting Section 141 (Steps S401 to S404)]

The temporary pile variable setting section 141 finds a set T of the transfer target steel materials (lots) i whose optimum values ($k\_it_{opt}[i]$) of the initial (primary) transfer time are less than the optimum values ($k\_ft_{opt}[i]$) of the final (secondary) transfer time ($k\_it_{opt}[i] < k\_ft_{opt}[i]$), based on "the optimum values $k\_it_{opt}[i]$ of the initial (primary) transfer time and the optimum values $k\_ft_{opt}[i]$ of the final (secondary) transfer time" calculated by the transfer time optimum solution calculating section 134. Here, the number of elements belonging to the set T, that is, the number of the transfer target steel materials (lots) i whose optimum values ($k\_it_{opt}[i]$) of the initial (primary) transfer time are less than the optimum values ($k\_ft_{opt}[i]$) of the final (secondary) transfer time ($k\_it_{opt}[i] < k\_ft_{opt}[i]$) is represented by $N_T$. The elements belonging to this set T are the transfer target steel materials (lots) i that are the targets of the temporary storage.

Then, the temporary pile variable setting section 141 sets the following decision variables in order to formulate constraint expressions and objective functions in later-described optimization calculation.

(i) Temporary Pile Allocation Variable (x[i][m]) (Step S402)

A temporary pile allocation variable (x[i][m]) is a 1-0 variable that becomes "1" when the transfer target steel material (lot) i that is the target of the temporary storage is allocated to a temporary pile m, and becomes "0" otherwise. Note that i∈T, m=1, . . . , $N_T$.

(ii) Stacking Relation Variable (y[$i_1$][$i_2$][m]) (Step S403)

The stacking relation variable (y[$i_1$][$i_2$][m]) is a 1-0 variable that becomes "1" when a pair of the transfer target steel materials (lots) i that are targets of the temporary storage ($i_1$, $i_2$: $i_1$ is on a lower side and $i_2$ is on an upper side thereof) is allocated to the temporary pile m, and becomes "0" otherwise.

(iii) Temporary Pile Necessity Determining Variable (δ[m]) (Step S404)

A temporary pile necessity determining variable (δ[m]) is a 1-0 variable that becomes "1" when at least one transfer target steel material (lot) i that is the target of the temporary storage is allocated to the temporary pile m, and becomes "0" otherwise.

The temporary pile variable setting section 141 gives the transfer target steel material (lot) i that is the target of the temporary storage and the temporary pile m to i and m of the temporary pile allocation variable (x[i][m]), gives mutually different ones out of the transfer target steel materials (lots) i that are the targets of the temporary storage and the temporary pile m to $i_1$, $i_2$, and m of the stacking relation variable (y[$i_1$][$i_2$][m]), and gives the temporary pile m to m of the temporary pile necessity determining variable (δ[m]), thereby setting these variables.

The temporary pile variable setting section 141 can be realized by, for example, the CPU of the yard management apparatus 100 executing a program stored in the ROM or the like by using the RAM as a work area.

Temporary Pile Constraint Expression Setting Section 142 (Steps S405 to S406)

The temporary pile constraint expression setting section 142 sets the following basic temporary pile constraint expressions which should be satisfied by "the temporary pile allocation variable (x[i][m]), the stacking relation variable (y[$i_1$][$i_2$][m]), and the temporary pile necessity determining variable (δ[m])" set (defined) by the temporary pile variable setting section 141 (which are pertaining to the definition of the variables).

(i) Transfer Lot Uniqueness Constraint (Step S405)

A transfer lot uniqueness constraint is a constraint that all the transfer target steel materials (lots) i that are the targets of the temporary storage each have to be surely allocated to any one of the temporary piles m only once. Specifically, the transfer lot uniqueness constraint is a constraint that any of the transfer target steel materials (lots) i that are the targets of the temporary storage needs to be allocated to only one temporary pile m being its initial transfer destination. Therefore, a transfer lot uniqueness constraint expression is represented by the following expression (11). This expression (11) can also be regarded as a defining constraint expression of the temporary pile allocation variable (x[i][m]).

[Formula 3]

$$\text{For given } i \in T, \sum_{m=1}^{N_T} x[i][m] = 1 \tag{11}$$

The temporary pile constraint expression setting section 142 gives the expression (11) "the temporary pile allocation variable (x[i][m]) and the number $N_T$ of candidate temporary piles m (that is, the number of the transfer target steel materials (lots) i that are the targets of the temporary storage)" set (defined) by the temporary pile variable setting section 141, thereby setting the transfer lot uniqueness constraint expression.

(ii) Stacking Relation Variable Defining Constraint (Step S406)

A stacking relation variable defining constraint is a constraint for defining the stacking relation variable (y[$i_1$][$i_2$][m]). A stacking relation variable defining constraint expression is represented by the following expression (12-1) to expression (12-3).

$$x[i_1][m]+x[i_2][m]-1 \leq y[i_1][i_2][m]+y[i_2][i_1][m] \tag{12-1}$$

$$x[i_1][m]+x[i_2][m] \geq 2 \times (y[i_1][i_2][m]+y[i_2][i_1][m]) \tag{12-2}$$

$$y[i_1][i_2][m]+y[i_2][i_1][m] \leq 1 \tag{12-3}$$

Table 1 shows relations between the temporary pile allocation variables (x[$i_1$][m], x[$i_2$][m]) and the stacking relation variable (y[$i_2$][$i_1$][m]).

TABLE 1

| x[$i_1$] [m] | x[$i_2$] [m] | x[$i_1$][m] + x[$i_2$][m] | x[$i_1$][m] + x[$i_2$][m] − 1 | y[$i_1$][$i_2$][m] + y[$i_2$][$i_1$][m] | 2 · y[$i_1$][$i_2$][m] + y[$i_2$][$i_1$][m]) |
|---|---|---|---|---|---|
| 0 | 0 | 0 | −1 | 0 | 0 |
| 1 | 0 | 1 | 0 | 0 | 0 |
| 0 | 1 | 1 | 0 | 0 | 0 |
| 1 | 1 | 2 | 1 | 1 | 2 |

As shown in the expression (12-1) to the expression (12-3), the stacking relation variable defining constraint expression is an expression defining the stacking relation variable (y[$i_1$][$i_2$][m]) by using "the temporary pile allocation variables ($x[i_1][m]$, $x[i_2][m]$) set (defined) by the temporary pile variable setting section 141.

A relation between the portions corresponding to the fourth column ($x[i_1][m]+x[i_2][m]-1$) and the fifth column ($y[i_1][i_2]m)+y[i_2][i_1][m]$) of the table shown in Table 1 is expressed by the expression (12-1). By this expression (12-1), a lower limit of the stacking relation variable ($y[i_1][i_2][m]$) is decided. The expression (12-1) indicates that, if the transfer target steel materials (lots) $i_1$, $i_2$ that are the targets of the temporary storage are both allocated to the same temporary pile m, the transfer target steel material (lot) $i_1$ that is the target of the temporary storage is on an upper side and the transfer target steel material (lot) $i_2$ that is the target of the temporary storage is on a lower side thereof, or the transfer target steel material (lot) $i_1$ that is the target of the temporary storage is on a lower side and the transfer target steel material (lot) $i_2$ that is the target of the temporary storage is on an upper side thereof.

The relation between the portions corresponding to the third column ($x[i_1][m]+x[i_2][m]$) and the sixth column ($2\times(y[i_1][i_2][m])+y[i_2][i_1][m]$) of the table shown in Table 1 is expressed by the expression (12-2). By this expression (12-2), an upper limit of the stacking relation variable ($y[i_1][i_2][m]$) is decided. The expression (12-2) indicates that, if the transfer target steel material (lot) $i_1$ that is the target of the temporary storage is temporarily stored on an upper side and the transfer target steel material (lot) $i_2$ that is the target of the temporary storage is temporarily stored on a lower side thereof, or if the transfer target steel material (lot) $i_1$ that is the target of the temporary storage is temporarily stored on a lower side and the transfer target steel material (lot) $i_2$ that is the target of the temporary storage is temporarily stored on an upper side thereof, the transfer target steel materials (lots) $i_1$, $i_2$ that are the targets of the temporary storage are both allocated to the temporary pile m.

Further, the expression (12-3) indicates that temporarily storing the transfer target steel material (lot) $i_1$ that is the target of the temporary storage on the upper side and the transfer target steel material (lot) $i_2$ that is the target of the temporary storage on the lower side thereof, and temporarily storing the transfer target steel material (lot) $i_1$ that is the target of the temporary storage on a lower side and the transfer target steel material (lot) $i_2$ that is the target of the temporary storage on an upper side thereof do not simultaneously hold.

The temporary pile constraint expression setting section 142 gives "the temporary pile allocation variable ($x[i][m]$) and the stacking relation variable ($y[i_1][i_2][m]$)" set (defined) by the temporary pile variable setting section 141 to the expression (12-1) and the expression (12-2), and gives "the stacking relation variable ($y[i_1][i_2][m]$)" set (defined) by the temporary pile variable setting section 141 to the expression (12-3), thereby setting the stacking relation variable defining constraint expression.

(iii) Stacking Order (Appearance) Constraint (Step S407)

A stacking order (appearance) constraint is a constraint regarding the stacking order (stacking appearance), in the temporary pile m, of the transfer target steel materials (lots) i that are the targets of the temporary storage. Hereinafter, the stacking order (appearance) constraint will be described.

In this embodiment, the stacking appearance constraint (vertical-relation constraint among the steel materials (or the transfer lots)) in the temporary pile m is decided by three elements, that is, (A) the arrival order, (B) the final transfer order, and (C) the size.

First, in the temporary pile m, the stacking must be performed from the bottom in "the arrival order," that is, in ascending order of the optimum value $k\_it_{opt}[i]$ of the initial transfer time.

Next, in the temporary pile m, the transfer to the main pile has to be performed in "the final transfer order," that is, in ascending order of the optimum value $k\_f_{opt}[i]$ of the final transfer time, and therefore, in the temporary pile m, the stacking order from the top has to be the ascending order of the optimum value $k\_ft_{opt}[i]$ of the final transfer time.

Finally, as for "the size," even in the temporary pile m, because it exists as a pile in the yard, though temporarily, the reverse stacking resulting in an unstable pile appearance in terms of length, width, and the like has to be prevented.

In this embodiment, since these three constraints all need to be satisfied (simultaneously), an arrangement relation of any two transfer target steel materials (lots) $i_1$, $i_2$ that are the targets of the temporary storage can be classified into the following four manners.

a) Whichever of the transfer target steel materials (lots) $i_1$, $i_2$ that are the targets of the temporary storage can be disposed on an upper side or on a lower side in the same temporary pile m.

b) When arranged in the same temporary pile m, the transfer target steel materials (lots) $i_1$, $i_2$ that are the targets of the temporary storage have to be arranged so that the transfer target steel material (lot) $i_1$ that is the target of the temporary storage comes on a lower side and the transfer target steel material (lot) $i_2$ that is the target of the temporary storage comes on an upper side thereof.

c) When arranged in the same temporary pile m, the transfer target steel materials (lots) $i_1$, $i_2$ that are the targets of the temporary storage have to be arranged so that the transfer target steel material (lot) $i_1$ that is the target of the temporary storage comes on an upper side and the transfer target steel material (lot) $i_2$ that is the target of the temporary storage comes on a lower side thereof.

d) The transfer target steel materials (lots) $i_1$, $i_2$ that are the targets of the temporary storage cannot be arranged in the same temporary pile m.

A method to determine to which of the aforesaid a) to d) the two transfer target steel materials (lots) $i_1$, $i_2$ that are the targets of the temporary storage are classified, by using "the optimum values ($k\_it_{opt}[i_1]$, $k\_it_{opt}[i_2]$) of the initial transfer time and the optimum values ($k\_ft_{opt}[i_1]$, $k\_ft_{opt}[i_2]$) of the final transfer time" of the two transfer target steel materials (lots) $i_1$, $i_2$ that are the targets of the temporary storage is as follows.

First, when the optimum value ($k\_it_{opt}[i_1]$) of the initial transfer time of the transfer target steel material (lot) $i_1$ that is the target of the temporary storage is less than the optimum value ($k\_it_{opt}[i_2]$) of the initial transfer time of the transfer target steel material (lot) $i_2$ that is the target of the temporary storage ($k\_it_{opt}[i_1]<k\_it_{opt}[i_2]$), there is a possibility that they are classified to the aforesaid b) or the aforesaid d).

Further, when the optimum value ($k\_ft_{opt}[i_2]$) of the final transfer time of the transfer target steel material (lot) $i_2$ that is the target of the temporary storage is less than the optimum value ($k\_ft_{opt}[i_1]$) of the final transfer time of the transfer target steel material (lot) $i_1$ that is the target of the temporary storage ($k\_ft_{opt}[i_1]>k\_ft_{opt}[i_2]$) and the transfer target steel material (lot) $i_1$ that is the target of the temporary storage can be stacked on a lower side and the transfer target steel material (lot) $i_2$ that is the target of the temporary storage can be stacked on an upper side thereof in view of the size constraint, they are classified to the aforesaid b).

On the other hand, when the optimum value (k_ft$_{opt}$[i$_1$]) of the final transfer time of the transfer target steel material (lot) i$_1$ that is the target of the temporary storage is less than the optimum value (k_ft$_{opt}$[i$_2$]) of the final transfer time of the transfer target steel material (lot) i$_2$ that is the target of the temporary storage (k_ft$_{opt}$[i$_1$]>(k_ft$_{opt}$[i$_2$]), or when the transfer target steel material (lot) i$_1$ that is the target of the temporary storage cannot be stacked on a lower side and the transfer target steel material (lot) i$_2$ that is the target of the temporary storage cannot be stacked on an upper side thereof due to the size constraint, they are classified to the aforesaid d).

When the optimum value (k_it$_{opt}$[i$_2$]) of the initial transfer time of the transfer target steel material (lot) i$_2$ that is the target of the temporary storage is less than the optimum value (k_it$_{opt}$[i$_1$]) of the initial transfer time of the transfer target steel material (lot) i$_1$ that is the target of the temporary storage (k_it$_{opt}$[i$_1$]>(k_it$_{opt}$[i$_2$]), there is a possibility that they are classified to the aforesaid c) or the aforesaid d).

Further, when the optimum value (k_ft$_{opt}$[i$_1$]) of the final transfer time of the transfer target steel material (lot) i$_1$ that is the target of the temporary storage is less than the optimum value (k_ft$_{opt}$[i$_2$]) of the final transfer time of the transfer target steel material (lot) i$_2$ that is the target of the temporary storage (k_ft$_{opt}$[i$_1$]<(k_ft$_{opt}$[i$_2$]), and the transfer target steel material (lot) i$_1$ that is the target of the temporary storage can be stacked on an upper side and the transfer target steel material (lot) i$_2$ that is the target of the temporary storage can be stacked on a lower side thereof in view of the size constraint, they are classified to the aforesaid c).

On the other hand, when the optimum value (k_ft$_{opt}$[i$_2$]) of the final transfer time of the transfer target steel material (lot) i$_2$ that is the target of the temporary storage is less than the optimum value (k_ft$_{opt}$[i$_1$]) of the final transfer time of the transfer target steel material (lot) i$_1$ that is the target of the temporary storage (k_ft$_{opt}$[i$_1$]>k_ft$_{opt}$[i$_2$]), or when the transfer target steel material (lot) i$_1$ that is the target of the temporary storage cannot be stacked on an upper side and the transfer target steel material (lot) i$_2$ that is the target of the temporary storage cannot be stacked on a lower side thereof due to the size constraint, they are classified to the aforesaid d).

Note that, as a result, they are never classified to the aforesaid a).

Then, the stacking order (appearance) constraint expression in the case of the classification to the aforesaid b) is the following expression (13-1), the stacking order (appearance) constraint expression in the case of the classification to the aforesaid c) is the following expression (13-2), and the stacking order (appearance) constraint expression in the case of the classification to the aforesaid d) is the following expression (13-3).

For given $m(=1, \ldots, N_T), y[i_2][i_1][m]=0$ (13-1)

For given $m(=1, \ldots, N_T), y[i_1][i_2][m]=0$ (13-2)

For given $m(=1, \ldots, N_T), y[i_1][i_2][m]+y[i_2][i_1][m]=0$ (13-3)

The temporary pile constraint expression setting section 142 determines to which of the aforesaid b) to d) the two different transfer target steel materials (lots) i$_1$, i$_2$ that are the targets of the temporary storage are classified, based on "the optimum values (k_it$_{opt}$[i$_1$], k_it$_{opt}$[i$_2$]) of the initial transfer time, the optimum values (k_ft$_{opt}$[i$_1$], k_ft$_{opt}$[i$_2$] of the final transfer time, and the steel material sizes" of the two different transfer target steel materials (lots) i$_1$, i$_2$ that are the targets of the temporary storage. Then, it sets the stacking order (appearance) constraint expression by giving the stacking relation variables (y[i$_1$][i$_2$][m], y[i$_2$][i$_1$][m]) to the stacking order (appearance) constraint expression (the expression (12-1), the expression (12-2), or the expression (12-3)) corresponding to the determined result.

(iv) Setting of Pile Height Constraint Expression (Step S408)

As described above, even the temporary pile m, though existing only temporarily in the yard, is subjected to a pile height constraint in the yard. Therefore, it is necessary to use the pile height constraint regarding an upper limit of the height of the temporary pile m. Here, let the upper limit number of stacking (the upper limit number of the transfer target steel materials (lots) that are the targets of the temporary storage, which can be stacked in the temporary pile m) be H, and the number of steel materials belonging to the transfer target steel material (lot) that is the target of the temporary storage be h$_i$, a pile height constraint expression is expressed by the following expression (14). Note that, when the transfer lot information is not generated (when the carrier cannot transfer two steel materials or more at a time), a value of h$_i$ becomes "1." Further, the upper limit number of stacking is stored in advance in the yard management apparatus 100.

[Formula 4]

$$\text{For given } m = 1, \ldots, N_T, \sum_{i \in T} h_i \cdot x[i][m] \leq H \cdot \delta[m] \quad (14)$$

The temporary pile constraint expression setting section 142 finds the number h$_i$ of the steel materials belonging to the transfer target steel material (lot) i that is the target of the temporary storage. Then, the temporary pile constraint expression setting section 142 gives the expression (14) "the number h$_i$ of the steel materials belonging to the transfer target steel material (lot) i that is the target of the temporary storage," "the set T, the temporary pile allocation variation (x[i][m]) and the temporary pile necessity determining variable (δ[m])" set by the temporary pile variable setting section 141, and "the upper limit number H of stacking," thereby setting the pile height constraint expression.

Note that the expression (14) is an expression defining a lower limit (a value below which is not allowed) of the sum of the temporary pile necessity determining variables (δ[m]) (that is, a later-described temporary pile objective function J$_B$ (refer to the expression (15)).

The temporary pile constraint expression setting section 142 can be realized by, for example, the CPU of the yard management apparatus 100 executing a program stored in the ROM or the like by using the RAM as a work area.

[Temporary Pile Objective Function Setting Section 143 (Step S409)]

The temporary pile objective function setting section 143 sets the temporary pile objective function J$_B$. In this embodiment, the temporary pile objective function J$_B$ is an objective function for reducing the total number of the temporary piles m. This is because the temporary storage space can be reduced by doing so.

The temporary pile objective function J$_B$ is expressed by the following expression (15).

[Formula 5]

$$J_B = \sum_{m=1}^{N_T} \delta[m] \quad (15)$$

The temporary pile objective function setting section 143 gives "the set T and the temporary pile necessity determining variables (δ[m])" set by the temporary pile variable setting section 141 to the expression (15), thereby setting the temporary pile objective function $J_B$.

The temporary pile objective function setting section 143 can be realized by, for example, the CPU of the yard management apparatus 100 executing a program stored in the ROM or the like by using the RAM as a work area.

[Temporary Pile Optimum Solution Calculating Section 144 (Step S410)]

The temporary pile optimum solution calculating section 144 calculates the decision variable ($y[i_1][i_2][m]$) so that the value of the temporary pile objective function $J_B$ set by the temporary pile objective function setting section 143 is minimized within a range satisfying the temporary pile constraint expressions (the expression (11), the expression (12-1) to the expression (12-3), the expression (13-1) to the expression (13-3)) set by the temporary pile constraint expression setting section 142. The decision variable thus calculated becomes the optimum value ($y_{opt}[i_1][i_2][m]$) of the stacking relation variable. Incidentally, the calculation of the optimum solution can be realized by using, for example, a known 0-1 integer programming program solution "solver."

The temporary pile optimum solution calculating section 144 can be realized by, for example, the CPU of the yard management apparatus 100 executing a program stored in the ROM or the like by using the RAM as a work area.

[Temporary Pile Information Generating Section 145 (Step S411)]

A temporary pile information generating section 145 sorts out a pair of the transfer target steel materials (lots) $i_1$, $i_2$ that are the targets of the temporary storage whose value of the optimum value ($y_{opt}[i_1][i_2][m]$) of the stacking relation variable is "1" ($y_{opt}[i_1][i_2][m]=1$), in each temporary pile m.

Here, that the value of the optimum value ($y_{opt}[i_1][i_2][m]$) of the stacking relation variable is "1" indicates that, in the temporary pile m, the transfer target steel material (lot) $i_1$ that is the target of the temporary storage is arranged on a lower side and the transfer target steel material (lot) $i_2$ that is the target of the temporary storage is arranged on an upper side thereof.

Therefore, by sorting out the pair of the transfer target steel materials (lots) $i_1$, $i_2$ that are the targets of the temporary storage whose value of the optimum value ($y_{opt}[i_1][i_2][m]$) of the stacking relation variable is "1," in each temporary pile m, it is possible to decide the stacking order of the transfer target steel materials (lots) i that are the targets of the temporary storage in each temporary pile m. For example, when the following expression (16-1) to expression (16-3) hold, the transfer target steel materials (lots) i that are the targets of the temporary storage in a temporary pile 1 (m=1) are stacked from the bottom in order of the transfer target steel materials (lots) 4, 3, 5 (i=4, 3, 5). By doing so, it is possible to form the optimum temporary piles m (that is, the temporary piles m in number as small as possible).

In this manner, the temporary pile information generating section 145 generates, as the optimum temporary pile information, information on the stacking order of the transfer target steel materials (lots) i that are the targets of the temporary storage, in each of the temporary piles m.

$$y_{opt}[3][5][1]=1 \quad (16\text{-}1)$$

$$y_{opt}[4][5][1]=1 \quad (16\text{-}2)$$

$$y_{opt}[4][3][1]=1 \quad (16\text{-}3)$$

<Transfer Work Instruction Generating Section 150> (Step S205)

Through the above processes, the transfer order of all the transfer target steel materials (lots) is decided, and for the transfer target steel materials (lots) which need to be temporarily stored, the temporary pile to which they should be transferred and the stacking order therein are decided. Note that the transfer target steel materials (lots) not requiring the temporary storage are directly transferred to the main pile.

Therefore, by deciding from and to which places the transfer target steel materials (lots) should be transferred (From-To) according to the transfer order of the transfer target steel materials (lots) decided in the above-described manner, it is possible to finalize a transfer command. In deciding the transfer command, the transfer work instruction generating section 150 appropriately allocates the transfer target steel materials (lots) to storage spaces having vacant addresses at the present moment as storage spaces (addresses in the yard) of the main piles and the temporary piles according to roles of these storage spaces, in order from the transfer target steel material (lot) whose transfer order is earlier.

First, at the time of the initial transfer of a transfer target steel material (lot) to arrive, a From address is a reception place of the yard (for example, the reception table), and a To address is an address of a main pile of the transfer target steel material (lot) when the temporary storage is not required, and is an address of a temporary pile of the transfer target steel material (lot) when the temporary storage is required.

Further, at the time of the final transfer of a transfer target steel material (lot) that is the target of the temporary storage, a From address is an address of a temporary pile of the transfer target steel material (lot), and a To address is an address of a main pile of the transfer target steel material (lot).

Further, as for an already arriving transfer target steel material (lot), only a From address at the time of the initial transfer is an address of an existing original pile (original pile stacking position) unlike the case of the transfer target steel material (lot) to arrive. The other is the same as in the case of the transfer target steel material (lot) to arrive.

Based on the optimum value ($k\_it_{opt}[i]$) of the initial transfer time, the optimum value ($k\_ft_{opt}[i]$) of the final transfer time, the optimum temporary pile information, the address of the original pile, the vacant address, and so on, the transfer work instruction generating section 150 thus decides the From-To address being a transfer route indicating from and to which places the transfer is to be performed (From-To) in the transfer order of the transfer target steel materials (lots).

The transfer work instruction generating section 150 can be realized by, for example, the CPU of the yard management apparatus 100 executing a program stored in the ROM or the like by using the RAM as a work area.

<Transfer Work Instructing Section 160> (Step S206)

When necessary, a transfer work instructing section 160 outputs, to the carrier 300, a transfer instruction (transfer work instruction including the transfer order, a transfer start position, and a transfer destination position of each transfer target steel material (lot)) obtained from the transfer work instruction generating section 150, to manage the physical distribution in the yard.

Here, when the carrier 300 is operated by a driving operation of a driver, the transfer work instructing section 160 transmits a display instruction signal for instructing to display an image based on the transfer work instruction, as a transfer instruction signal to, for example, a display device included in the carrier 300. When receiving the transfer instruction signal, a computer included in the carrier 300 generates display data displaying the contents of the transfer instruction based on the transfer instruction signal and displays an image which is decided based on the generated display data, on the display device included in the carrier 300. Based on the display of the image, the driver specifies the timing when the carrier 300 driven by himself/herself needs to transfer the steel material, the steel material, and an address where the steel material exists and an address of the transfer destination of the steel material (From-To addresses) to drive the carrier 300. As a result, the carrier 300 performs the operation for transferring the steel material according to the transfer work instruction decided based on the transfer instruction signal.

On the other hand, when the carrier 300 automatically operates without depending on the driving operation of the driver, a control signal for instructing the carrier 300 to operate according to the transfer work instruction is transmitted as the transfer instruction signal. Further, in this case, the carrier 300 periodically receives, from the steel material management system computer 200, a yard current state signal indicating a current state of each steel material placed in the yard. Concretely, the yard present state signal is a signal indicating, for example, which steel material is stacked at which position from the top (bottom) at which address in the yard at the present moment. Based on the control signal transmitted from the transfer work instructing section 160 and the yard current state signal transmitted from the steel material management system computer 200, the carrier 300 performs the operation for transferring the steel materials according to the transfer work instruction decided based on the transfer instruction signal.

As described above, when the carrier 300 automatically operates without depending on the driving operation of the driver, the yard management apparatus 100 has a function as a carrier control apparatus which controls the operation of the carrier 300. In this case, it is possible to configure a yard management system having the yard management apparatus 100 functioning as the carrier control apparatus and one carrier 300 or more. In this case, as described above, the carrier 300 automatically performs the operation for transferring the steel materials according to the transfer work instruction decided based on the transfer instruction signal, based on the transfer work instruction signal received from the transfer work instructing section 160 and the yard current state signal received from the steel material management system computer 200 being an external apparatus.

The transfer work instructing section 160 can be realized by, for example, the communication interface of the yard management apparatus 100 communicating with the carrier 300 such as a crane and by the CPU of the yard management apparatus 100 executing a program stored in the ROM or the like by using the RAM as a work area.

As described above, in this embodiment, by using, as the decision variables, the initial transfer time ($k\_it[i]$) • the final transfer time ($k\_ft[i]$) of each of the transfer target steel materials (lots) i including the materials to arrive and the already arriving materials, the transfer constraint expression regarding the transfer order of the transfer target steel materials (lots) i and the transfer objective function for minimizing the time during which the transfer target steel materials (lots) i stay in the course of being transferred to the main pile are expressed, and the optimum values ($k\_it_{opt}[i]$, $k\_ft_{opt}[i]$) of the initial transfer time • the final transfer time of the transfer target steel material (lot) i are derived so that the transfer objective function $J_A$ is minimized within the range satisfying the transfer constraint expression. Therefore, even under the situation where the already arriving materials and the materials to arrive both exist, it is possible to determine which transfer target steel material (lot) i is to be used for the temporary storage (for breaking the chain state of the conflict), based on the optimum values ($k\_it_{opt}[i]$, $k\_ft_{opt}[i]$) of the initial transfer time • the final transfer time of the transfer target steel material (lot) i. Therefore, even under the situation where the already arriving materials and the materials to arrive both exist, it is possible to calculate the optimum transfer timing of these in the yard. As a result, it is possible to transfer the steel materials at appropriate timings.

Further, in this embodiment, the transfer target steel materials (lots) i that are the targets of the temporary storage are specified based on the optimum values ($k\_it_{opt}[i]$, $k\_ft_{opt}[i]$) of the initial transfer time • the final transfer time of the transfer target steel materials (lots) i. Then, regarding the transfer target steel materials (lots) i that are the targets of the temporary storage, by using, as the decision variable, the stacking relation variable ($y[i_1][i_2][m]$) being the 1-0 variable that takes the value "1" when they are located vertically adjacent to each other in the same temporary pile m, and takes the value "0" when they are not, the temporary pile constraint expression regarding the stacking order in the temporary pile and the temporary pile objective function for minimizing the number of the temporary piles are expressed, and the optimum value ($y_{opt}[i_1][i_2][m]$) of the stacking relation variable is derived so that the temporary objective function $J_B$ is minimized within the range satisfying the temporary pile constraint expression. Therefore, from the optimum value ($y_{opt}[i_1][i_2][m]$) of the stacking relation variable, it is possible to decide the stacking order of the transfer target steel materials (lots) i that are the targets of the temporary storage in each temporary pile m, which can reduce the temporary storage spaces as much as possible.

Then, based on the optimum values ($k\_it_{opt}[i]$, $k\_ft_{opt}[i]$) of the initial transfer time • the final transfer time of the transfer target steel materials (lots) i and the optimum value ($y_{opt}[i_1][i_2][m]$) of the stacking relation variable, the transfer routes of the transfer target steel materials (lots) i are decided. Therefore, it is possible to reduce the number of transfer times, the temporary storage time, and the temporary storage space as much as possible, realize efficient management of the yard, and avoid a failure in the reception in the yard and the congestion of the steel materials on the reception table.

Owing to the above, it is possible to prevent a temperature decrease of the steel materials, the complication of heating control in a heating furnace of a post-step, and deterioration of quality of steel material products.

Modification Example

It is preferable to reduce the number of the temporary piles m as much as possible by finding the optimum value ($y_{opt}[i_1][i_2][m]$) of the stacking relation variable as in this embodiment. However, the optimum value ($y_{opt}[i_1][i_2][m]$) of the stacking relation variable does not always have to be found. For example, when there is enough room for the storage space in the yard, and when the number of the transfer target steel materials (lots) i to be temporarily stored is small, the temporary pile may be formed for each transfer target steel material (lot) i. In this case, the temporary pile deciding section 140 need not output, to the transfer work instruction generating section 150, an instruction to form the same number of the temporary piles as the number of the transfer target steel materials (lots) that are the targets of the temporary storage.

Further, deriving the From-To address as in this embodiment is preferable because this enables the automatic derivation of the transfer order and the transfer route of each transfer target steel material (lot). However, if the optimum value (k_it$_{opt}$[i]) of the initial transfer time, the optimum value (k_ft$_{opt}$[i]) of the final transfer time, and the optimum temporary pile information (the transfer target steel materials (lots) i that are the targets of the temporary storage (and their stacking order) in each temporary pile m) are found and they are made accessible by a user, the From-To address does not always have to be derived. In this case, for example, the user may decide the From-To address based on them. Further, in this embodiment, the yard management apparatus 100 controls the operation of the carrier 300 based on the From-To address, but the From-To address may be input to an information processing apparatus different from the yard management apparatus 100 and this information processing apparatus may control the operation of the carrier 300.

Further, in this embodiment, the case where the steel materials are the targets of the transfer is described as an example. However, the targets of the transfer do not always have to be the steel materials. For example, this embodiment is applicable to a metal manufacturing process of manufacturing metal materials such as aluminum, titanium, copper, or the like, instead of the steel materials. In this case, "steel material" in the above description can be replaced by "metal material" such as "aluminum material."

Further, the inter-step storage space may be storage space between two manufacturing steps and the metal material may be a semi-finished product, or the inter-step storage space may be storage space between a manufacturing step and a shipping step and the metal material may be a final product. At this time, when a plurality of metal materials are transported and disposed while housed in a container, the container housing the metal materials may be handled as one steel material. Further, the inter-step storage space is not limited to storage space in the metal manufacturing process, and may be ordinary one in physical distribution and transfer between steps. In the physical distribution field, the application also to the transfer and arrangement of containers is possible, regardless of the contents therein. Therefore, in the present invention, the metal material includes at least one of a final product, a semi-finished product, and a container.

When all the dimensions (sizes) are the same like those of containers, no reverse stacking occurs, and therefore, (C) the constraint regarding the size in (iii) the stacking order (appearance) constraint is not necessary.

(Hardware Configuration)

Figure 8:
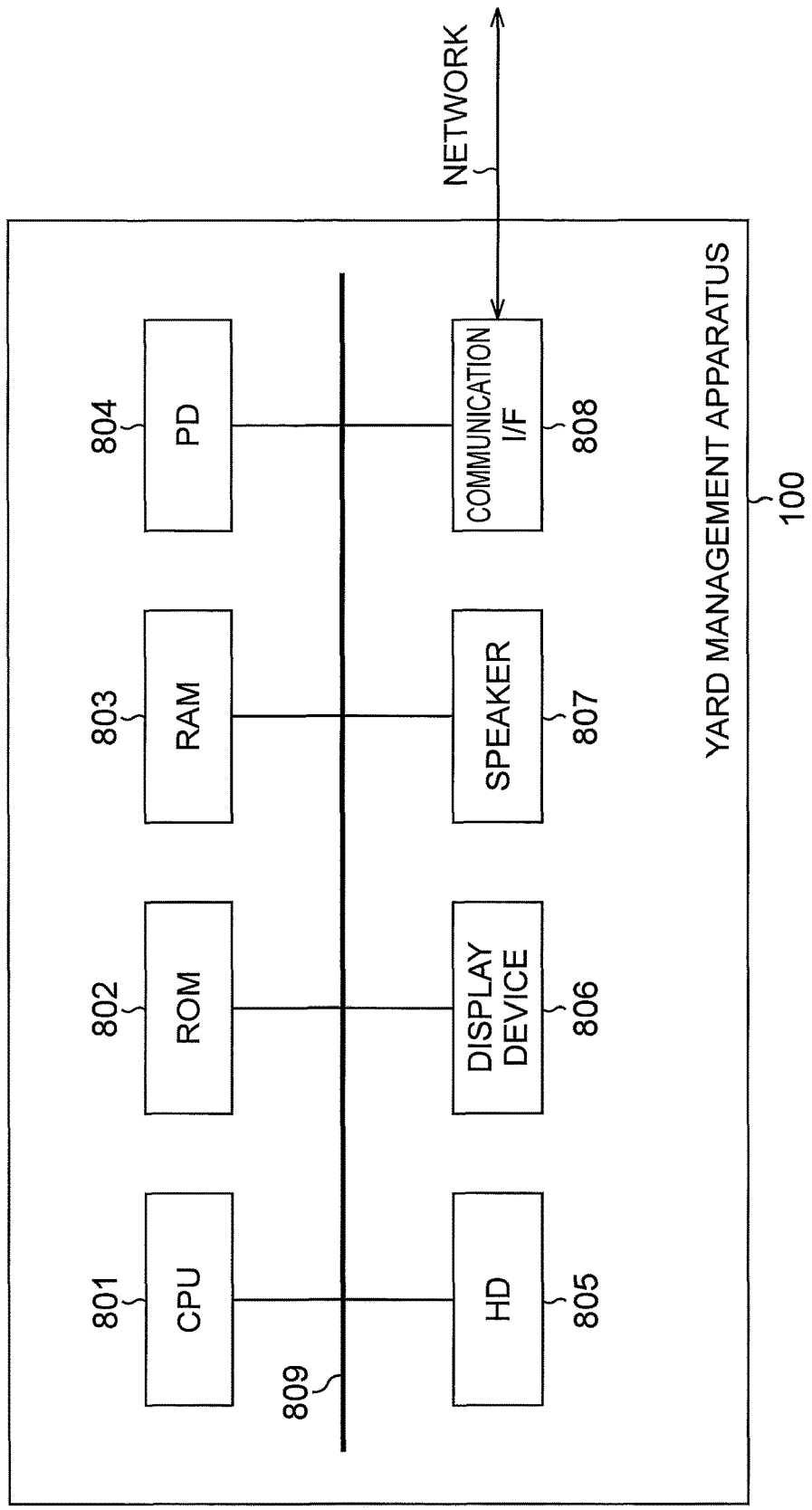
FIG. 8 is a diagram showing an example of a hardware configuration of the yard management apparatus.

FIG. 8 is a diagram showing an example of a hardware configuration of the yard management apparatus 100.

As shown in FIG. 8, the yard management apparatus 100 includes a CPU (Central Processing Unit) 801, a ROM (Read Only Memory) 802, a RAM (Random Access Memory) 803, a PD (Pointing Device) 804, a HD (Hard Disk) 805, a display device 806, a speaker 807, a communication I/F (Interface) 808, and a system bus 809.

The CPU 801 centrally controls the operation in the yard management apparatus 100 and controls the parts (802 to 808) of the yard management apparatus 100 via the system bus 809.

The ROM 802 stores BIOS (Basic Input/Output System) and an operating system program (OS) which are control programs of the CPU 801, programs necessary for the CPU 801 to execute the aforesaid processes, and so on.

The RAM 803 functions as a main memory, a work area, and so on of the CPU 801. In executing the processes, the CPU 801 realizes various kinds of operations by loading, to the RAM 803, necessary computer programs and the like from the ROM 802 and necessary information and the like from the HD 805 and executing processes of the computer programs and the like and the information and the like.

The PD 804 includes, for example, a mouse, a keyboard, and so on, and forms an operation input arrangement used for an operator to perform an operation input to the yard management apparatus 100 when necessary.

The HD 805 forms a storage arrangement which stores various kinds of information, data, files, and so on.

The display device 806 forms a display arrangement which displays various kinds of information and images based on the control by the CPU 801.

The speaker 807 forms a sound output arrangement which outputs sound relating to various kind of information based on the control by the CPU 801.

The communication I/F 808 communicates with an external apparatus for various kinds of information and so on via a network based on the control by the CPU 801.

The system bus 809 is a bus for connecting the CPU 801, the ROM 802, the RAM 803, the PD 804, the HD 805, the display device 806, the speaker 807, and the communication I/F 808 so as to enable their mutual communication.

Note that the embodiment of the present invention described above can be realized by a computer executing a program. Further, a computer-readable recording medium which records the program and a computer program product of the program and so on can also be applied as embodiments of the present invention. As the recording medium, usable are, for example, a flexible disk, a hard disk, an optical disk, a magneto-optic disk, a CD-ROM, a magnetic tape, a nonvolatile memory card, a ROM, and the like.

Thus, according to an example embodiment of the present invention, an information obtaining arrangement or step is realized by, for example, a steel material information obtaining section 110 and/or Step S201. Metal material identification information is realized by, for example, the transfer target steel material (lot) i. Main pile information is realized by, for example, the main pile number and the main pile stacking position. Information for specifying the main pile is realized by, for example, the main pile number. Information on a stacking position of the relevant metal material in the main pile is realized by, for example, the main pile stacking position. Original pile information is realized by, for example, the original pile number and the original pile stacking position. Information for specifying to which original pile composed of metal materials stacked in the yard at a present moment the relevant metal material belongs is realized by, for example, the original pile number. Information on a stacking position, in the relevant original pile, of the relevant metal material which has already arrived is realized by, for example, the original pile stacking position. Scheduled arrival time information is realized by, for example, the scheduled arrival time at the reception table.

A transfer time constraint expression setting arrangement and/or step is realized by, for example, the transfer time variable setting section 131 and the transfer time constraint expression setting section 132 (Steps S301 to S308).

A transfer time constraint expression is realized by, for example, the expression (1), the expression (2), the expression (3), the expression (4), the expression (5-1), the expression (5-2), the expression (6-1), the expression (6-2), the expression (6-3), and the expression (7).

A transfer time objective function setting arrangement and/or step is realized by, for example, the transfer time variable setting section 131 and the transfer time objective function setting section 133 (Steps S301, S302, S309 to S311).

A transfer time objective function is realized by, for example, the expression (10). Here, a time during which the transfer target steel material stays in a course of being transferred to the main pile is realized by, for example, the total temporary storage time and the total waiting time on the reception table (the weighted linear sum thereof).

A transfer time optimum solution calculating arrangement and/or step is realized by, for example, the transfer time optimum solution calculating section 134 (Step S312).

A temporary pile deciding arrangement and/or step is realized by, for example, the temporary pile deciding section 140 deciding the transfer target steel material (lot) i that is the target of the temporary storage.

In an example, the temporary deciding arrangement includes a temporary pile constraint expression setting arrangement and/or step realized by, for example, the temporary pile variable setting section 141 and the temporary pile constraint expression setting section 142 (Steps S401 to S408).

A first temporary pile constraint expression is realized by, for example, the expression (13-1), the expression (13-2), and the expression (13-3).

A stacking relation 1-0 variable is realized by, for example, the stacking relation variable ($y[i_1][i_2][m]$).

A second temporary pile constraint expression is realized by, for example, the expression (14).

A temporary pile necessity 1-0 variable is realized by, for example, the temporary pile necessity determining variable ($\delta[m]$).

A temporary pile objective function setting arrangement and/or step is realized by, for example, the temporary pile variable setting section 141 and the temporary pile objective function setting section 143 (Steps S403, S409).

A temporary pile objective function is realized by, for example, the expression (15).

A temporary pile optimum solution calculating arrangement and/or step is realized by, for example, the temporary pile optimum solution calculating section 144 (Step S410).

A temporary pile information generating arrangement and/or step is realized by, for example, the temporary pile information generating section 145 (Step S411).

Temporary pile information is realized by, for example, the information on the stacking order of the transfer target steel materials (lots) i that are the targets of the temporary storage, in each temporary pile m.

In an example, a first initial transfer time constraint expression is realized by, for example, the expression (3). A second initial transfer time constraint expression is realized by, for example, the expression (4). A final transfer time constraint expression is realized by, for example, the expression (7). A carrier's simultaneous transfer constraint expression is realized by, for example, the expression (6-1), the expression (6-2), and the expression (6-3). A transfer time objective function is realized by, for example, the expression (8).

In an example, vacant space information is realized by, for example, the vacant address. A transfer work instruction generating arrangement and/or step is realized by, for example, the transfer work instruction generating section 150 (Step S205). A transfer work instructing arrangement and/or step is realized by, for example, the transfer work instructing section 160 (Step S206).

Further, all of the embodiments of the present invention described above only illustrate concrete examples in carrying out the present invention, and the technical scope of the present invention should not be limitedly construed by them.

That is, the present invention can be embodied in various forms without departing from its technical idea or its main features.

The invention claimed is:

1. A yard management system configured to manage an arrangement of metal materials which have already arrived at a yard and metal materials which have not yet arrived at the yard for causing an automated carrier to transfer the metal materials and for creating a main pile composed of the metal materials stacked in a stacking order that is according to an order of delivery to a post-step of the yard, wherein the metal materials are transferred in transfer units that each includes one or more metal materials, the yard is an inter-step storage space where the metal materials are disposed, and the metal materials include at least one of semi-finished products, final products, and containers, the system comprising:

an automated carrier; and
processing circuitry configured to:
 obtain from an external source:
  metal material identification information that identifies metal materials which have already arrived and metal materials which have not arrived yet;
  main pile information that identifies a main pile, at least one respective metal material for which the identified main pile is a respective transfer destination, and a respective stacking position of each of the at least one respective metal material in the main pile;
  original pile information that, for each of at least one metal material that has already arrived and is already in a respective original pile in the yard, identifies the respective original pile and the respective stacking position within the respective original pile in which each of the at least one metal material is stacked; and
  scheduled arrival time information that identifies a respective scheduled arrival time at a reception entrance of the yard for each of at least one metal material which has not yet arrived;
 set transfer time constraint expressions for respective transfer target metal materials, wherein:
  (I) each of the transfer time constraint expressions (a) is based on the obtained information and (b) for a respective transfer unit identified in the respective expression by a respective number, expresses, relative to a current time, a respective variable that is a constraint on a time of transfer, by the automated carrier, of the respective transfer target material in the identified transfer unit; and
  (II) the variables include at least one of an initial transfer time, which is a first transfer start time, and a final transfer time, which is a start time of a transfer to the main pile;
 set, for the respective transfer target metal materials and based on the obtained information, transfer time objective functions that each (a) includes, as a variable, at least one of the initial transfer time and the final transfer time set for a respective one of the transfer target metal materials, and (b) expresses a time during which the respective transfer target metal material stays in a course of being transferred to the main pile;
 calculate, for each of the transfer target metal materials, an optimum value of the initial transfer time and an optimum value of the final transfer time so as to satisfy the transfer time constraint expression of the respective transfer target metal material and minimize a value of the transfer time objective function; and determine, for each of the transfer target metal materials and based on the respective optimum value of the initial transfer time and the optimum value of the final transfer time calculated for the respective transfer target metal material, whether or not the respective transfer target metal material needs to be designated as a target for temporary storage at the yard in a temporary pile before being transferred to the main pile, wherein the automated carrier is configured to:

perform a first transfer of at least one of the transfer target metal materials at the optimum value of the initial transfer time, transfer the at least one transfer target metal material to the main pile at the optimum value of the final transfer time, and store the transfer target metal material as a target for temporary storage at the yard at the optimum value of the first initial transfer time.

2. The yard management system of claim 1, wherein, for the determination, the processing circuitry is configured to:

set a temporary pile constraint expression based on information on the transfer target metal materials that are the targets of the temporary storage, the temporary pile constraint expression including:

a first temporary pile constraint expression that includes a stacking relation variable that (a) represents an allocation of a plurality of the transfer target metal materials that are the targets of the temporary storage to the temporary pile, (b) represents, and expresses a constraint relating to, a stacking order of the transfer target metal materials, in the temporary pile, and (c) is a binary variable that can assume a value of "1" or "0"; and a second temporary pile constraint expression that:

(I) includes at least one temporary pile necessity variable that (a) represents whether or not each of at least one of the transfer target metal materials that are the targets of the temporary storage is allocated to a respective candidate temporary pile, the allocation referring to the respective candidate temporary pile by a number that corresponds to a number representing the respective transfer target metal material in a current pile and (b) is a binary variable that can assume a value of 1" or "0"; and (II) defines a lower limit of a sum of the temporary pile necessity variables;

set a temporary pile objective function that (a) is based on the information on the transfer target metal materials that are the targets of the temporary storage, (b) includes the temporary pile necessity variables as a variable, and (c) expresses the number of the temporary piles to which the transfer target metal materials that are the targets of the temporary storage are allocated, by the sum of the temporary pile necessity variables;

calculate an optimum value of the stacking relation variable, for each of the transfer target metal materials that are the targets of the temporary storage, so as to satisfy the temporary pile constraint expression and minimize a value of the temporary pile objective function; and based on the optimum value of the stacking relation variable, generate temporary pile information including, for a respective transfer target metal material that is the target of the temporary storage:

information specifying the respective temporary pile to which the respective transfer target metal material is allocated; and information on a stacking position of the respective transfer target metal material in the temporary pile.

3. The yard management system of claim 2, wherein:

the stacking relation variable, when set to "1," represents a condition that, out of two transfer target metal materials that are targets of the temporary storage allocated to a same temporary pile, one of the two transfer target metal materials is allocated to a lower side of the same temporary pile and the other of the two transfer target metal materials is allocated to an upper side of the same temporary pile, and, when set to "0," represents negation of the condition;

the first temporary pile constraint expression includes a stacking order constraint expression which, by using the stacking relation variable, expresses that the transfer target metal materials that are the targets of the temporary storage are disposed from a lower side of the temporary pile in ascending order of the optimum value of the initial transfer time, and are disposed from an upper side of the temporary pile in ascending order of the optimum value of the final transfer time; and the second temporary pile constraint expression includes a pile height constraint expression which, by using the temporary pile necessity variable, expresses that the number of the stacked transfer target metal materials that are the targets of the temporary storage in the temporary pile is equal to or less than a predetermined number.

4. The yard management system of claim 1, wherein:

the transfer time constraint expression includes:

a first initial transfer time constraint expression which expresses that a sum time of the initial transfer time and a transfer time by a carrier, of the transfer target metal material to arrive, is earlier than the initial transfer time of a transfer target metal material to arrive which arrives next;

a second initial transfer time constraint expression which expresses that, in the same original pile, a sum time of the initial transfer time and the transfer time by the carrier of the transfer target metal material disposed on an upper side is earlier than the initial transfer time of the transfer target metal material disposed on a lower side thereof;

a final transfer time constraint expression which expresses that, in the same main pile, the final transfer time of the transfer target metal material disposed on an upper side is later than a sum time of the final transfer time and the transfer time, by the carrier, of the transfer target metal material disposed on a lower side thereof; and a carrier's simultaneous transfer constraint expression which, by using the initial transfer times of a transfer target metal material that has not yet arrived and of a transfer target metal material that has already arrived, expresses that a time period when the transfer target metal material that has not yet arrived is first transferred by the carrier and a time period when the transfer target metal material which has already arrived is first transferred by the carrier do not overlap, the time periods being relative to a present moment; and the transfer time objective function is a weighted linear sum of a sum of temporal differences between the final transfer times and the initial transfer times of the respective transfer target metal materials and a sum of temporal differences between the initial transfer times and the scheduled arrival times of the respective transfer target metal materials that have not yet arrived.

5. The yard management system of claim 1, wherein the processing circuitry is further configured to:
   obtain from the external source vacant space information indicating a position of a vacant space in the yard;
   generate transfer work instruction information including a transfer route of each of the transfer target metal materials by the carrier, the transfer work instruction information being based on the initial transfer time, the final transfer time, temporary pile information including the information for specifying the transfer target metal material that is the target of the temporary storage, the main pile information, the original pile information, and the vacant space information; and
   output to the carrier a transfer work instruction signal based on the transfer work instruction information.

6. The yard management system of claim 5, wherein the transfer work instruction signal is a display instruction signal for instructing a display of the transfer work instruction information by a display device included in the carrier.

7. The yard management system of claim 5, wherein:
   the transfer work instruction signal is a control signal for instructing an operation according to the transfer work instruction information; and
   the carrier is configured to automatically operate based on the control signal.

8. A yard management method for managing an arrangement of metal materials which have already arrived at a yard and metal materials which have not yet arrived at the yard, for causing an automated carrier to transfer the metal materials and for creating a main pile composed of the metal materials stacked in a stacking order that is according to an order of delivery to a post-step of the yard, wherein the metal materials are transferred in transfer units that each includes one or more metal materials, the yard is an inter-step storage space where the metal materials are disposed, and the metal materials include at least one of semi-finished products, final products, and containers, the method comprising:
   obtaining, by processing circuitry of a computer and from an external source:
      metal material identification information that identifies metal materials which have already arrived and metal materials which have not arrived yet;
      main pile information that identifies a main pile, at least one respective metal material for which the identified main pile is a respective transfer destination, and a respective stacking position of each of the at least one respective metal material in the main pile;
      original pile information that, for each of at least one metal material that has already arrived and is already in a respective original pile in the yard, identifies the respective original pile and the respective stacking position within the respective original pile in which the each of the at least one metal material is stacked; and
      scheduled arrival time information that identifies a respective scheduled arrival time at a reception entrance of the yard for each of at least one metal material which has not yet arrived;
   setting, by the processing circuitry of the computer, transfer time constraint expressions for respective transfer target metal materials, wherein:
      (I) each of the transfer time constraint expressions (a) is based on the obtained information and (b) for a respective transfer unit identified in the respective expression by a respective number, expresses, relative to a current time, a respective variable that is a constraint on a time of transfer, by the automated carrier, of the respective transfer target material in the identified transfer unit; and
      (II) the variables include at least one of an initial transfer time, which is a first transfer start time, and a final transfer time, which is a start time of a transfer to the main pile;
   setting, by the processing circuitry of the computer, for the respective transfer target metal materials, and based on the obtained information, transfer time objective functions that each (a) includes, as a variable, at least one of the initial transfer time and the final transfer time set for a respective one of the transfer target metal materials, and (b) expresses a time during which the respective transfer target metal material stays in a course of being transferred to the main pile;
   calculating, by the processing circuitry of the computer and for each of the transfer target metal materials, an optimum value of the initial transfer time and an optimum value of the final transfer time so as to satisfy the transfer time constraint expression of the respective transfer target metal material and minimize a value of the transfer time objective function;
   determining, by the processing circuitry of the computer, for each of the transfer target metal materials, and based on the respective optimum value of the initial transfer time and the optimum value of the final transfer time calculated for the respective transfer target metal material, whether or not the respective transfer target metal material needs to be designated as a target for temporary storage at the yard in a temporary pile before being transferred to the main pile;
   perform, by the automated carrier, a first transfer of at least one of the transfer target metal materials at the optimum value of the initial transfer time,
   transfer, by the automated carrier, the at least one transfer target metal material to the main pile at the optimum value of the final transfer time, and
   store, by the automated carrier, the transfer target metal material as a target for temporary storage at the yard at the optimum value of the first initial transfer time.

9. The yard management method of claim 8, wherein the determining includes:
   setting a temporary pile constraint expression based on information on the transfer target metal materials that are the targets of the temporary storage, the temporary pile constraint expression including:
      a first temporary pile constraint expression that includes a stacking relation variable that (a) represents an allocation of a plurality of the transfer target metal materials that are the targets of the temporary storage to the temporary pile, (b) represents, and expresses a constraint relating to, a stacking order of the transfer target metal materials, in the temporary pile, and (c) is a binary variable that can assume a value of "1" or "0"; and
      a second temporary pile constraint expression that:
         (I) includes at least one temporary pile necessity variable that (a) represents whether or not each of at least one of the transfer target metal materials that are the targets of the temporary storage is allocated to a respective candidate temporary pile, the allocation referring to the respective candidate temporary pile by a number that corresponds to a number representing the respective transfer target metal material in a current pile and (b) is a binary variable that can assume a value of 1" or "0"; and (II) defines a lower limit of a sum of the temporary pile necessity variables;

setting a temporary pile objective function that (a) is based on the information on the transfer target metal materials that are the targets of the temporary storage, (b) includes the temporary pile necessity variables as a variable, and (c) expresses the number of the temporary piles to which the transfer target metal materials that are the targets of the temporary storage are allocated, by the sum of the temporary pile necessity variables;

calculating an optimum value of the stacking relation variable, for each of the transfer target metal materials that are the targets of the temporary storage, so as to satisfy the temporary pile constraint expression and minimize a value of the temporary pile objective function; and based on the optimum value of the stacking relation variable, generating temporary pile information including, for a respective transfer target metal material that is the target of the temporary storage:

information specifying the respective temporary pile to which the respective transfer target metal material is allocated; and information on a stacking position of the respective transfer target metal material in the temporary pile.

10. The yard management method of claim 9, wherein:

the stacking relation variable, when set to "1," represents a condition that, out of two transfer target metal materials that are targets of the temporary storage allocated to a same temporary pile, one of the two transfer target metal materials is allocated to a lower side of the same temporary pile and the other of the two transfer target metal materials is allocated to an upper side of the same temporary pile, and, when set to "0," represents negation of the condition;

the first temporary pile constraint expression includes a stacking order constraint expression which, by using the stacking relation variable, expresses that the transfer target metal materials that are the targets of the temporary storage are disposed from a lower side of the temporary pile in ascending order of the optimum value of the initial transfer time, and are disposed from an upper side of the temporary pile in ascending order of the optimum value of the final transfer time; and the second temporary pile constraint expression includes a pile height constraint expression which, by using the temporary pile necessity variable, expresses that the number of the stacked transfer target metal materials that are the targets of the temporary storage in the temporary pile is equal to or less than a predetermined number.

11. The yard management method of claim 8, wherein:

the transfer time constraint expression includes:

a first initial transfer time constraint expression which expresses that a sum time of the initial transfer time and a transfer time by a carrier, of the transfer target metal material to arrive, is earlier than the initial transfer time of a transfer target metal material to arrive which arrives next;

a second initial transfer time constraint expression which expresses that, in the same original pile, a sum time of the initial transfer time and the transfer time by the carrier of the transfer target metal material disposed on an upper side is earlier than the initial transfer time of the transfer target metal material disposed on a lower side thereof;

a final transfer time constraint expression which expresses that, in the same main pile, the final transfer time of the transfer target metal material disposed on an upper side is later than a sum time of the final transfer time and the transfer time, by the carrier, of the transfer target metal material disposed on a lower side thereof; and a carrier's simultaneous transfer constraint expression which, by using the initial transfer times of a transfer target metal material that has not yet arrived and of a transfer target metal material that has already arrived, expresses that a time period when the transfer target metal material that has not yet arrived is first transferred by the carrier and a time period when the transfer target metal material which has already arrived is first transferred by the carrier do not overlap, the time periods being relative to a present moment; and the transfer time objective function is a weighted linear sum of a sum of temporal differences between the final transfer times and the initial transfer times of the respective transfer target metal materials and a sum of temporal differences between the initial transfer times and the scheduled arrival times of the respective transfer target metal materials that have not yet arrived.

12. The yard management method of claim 8, further comprising:

obtaining, by the processing circuitry and from the external source, vacant space information indicating a position of a vacant space in the yard;

generating, by the processing circuitry, transfer work instruction information including a transfer route of each of the transfer target metal materials by the carrier, the transfer work instruction information being based on the initial transfer time, the final transfer time, temporary pile information including the information for specifying the transfer target metal material that is the target of the temporary storage, the main pile information, the original pile information, and the vacant space information; and outputting, by the processing circuitry and to the carrier, a transfer work instruction signal based on the transfer work instruction information.

13. The yard management method of claim 12, wherein the transfer work instruction signal is a display instruction signal for instructing a display of the transfer work instruction information by a display device included in the carrier.

14. The yard management method of claim 12, wherein:

the transfer work instruction signal is a control signal for instructing an operation according to the transfer work instruction information; and the carrier is configured to automatically operate based on the control signal.

* * * * *